US011297268B2

United States Patent
Sakakibara

(10) Patent No.: US 11,297,268 B2
(45) Date of Patent: Apr. 5, 2022

(54) SOLID-STATE IMAGING ELEMENT, IMAGING APPARATUS, AND METHOD OF CONTROLLING SOLID-STATE IMAGING ELEMENT

(71) Applicant: Sony Semiconductor Solutions Corporation, Kanagawa (JP)

(72) Inventor: Masaki Sakakibara, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/766,447

(22) PCT Filed: Sep. 18, 2018

(86) PCT No.: PCT/JP2018/034437
§ 371 (c)(1),
(2) Date: May 22, 2020

(87) PCT Pub. No.: WO2019/135303
PCT Pub. Date: Jul. 11, 2019

(65) Prior Publication Data
US 2021/0152762 A1 May 20, 2021

(30) Foreign Application Priority Data

Jan. 5, 2018 (JP) .............................. JP2018-000577

(51) Int. Cl.
*H04N 5/357* (2011.01)
*H04N 5/351* (2011.01)
(Continued)

(52) U.S. Cl.
CPC ............. *H04N 5/357* (2013.01); *H04N 5/351* (2013.01); *G06K 9/03* (2013.01); *G06K 9/209* (2013.01)

(58) Field of Classification Search
CPC .......... H04N 5/357; H04N 5/351; G06K 9/03; G06K 9/209
See application file for complete search history.

(56) References Cited

U.S. PATENT DOCUMENTS

| 2017/0018226 A1* | 1/2017 | Yang ..................... G09G 3/3233 |
| 2017/0033777 A1 | 2/2017 | Kim et al. |
| 2017/0039945 A1* | 2/2017 | Wang ................... G09G 3/3258 |

FOREIGN PATENT DOCUMENTS

| JP | 2008-066320 A | 3/2008 |
| JP | 2009-508085 A | 2/2009 |

(Continued)

OTHER PUBLICATIONS

P. Liehtsteiner et al., "A 128 x 128 120 dB 15 μs Latency Asynchronous Temporal Contrast Vision Sensor," IEEE Journal of Solid State Circuits, vol. 43 No. 2, pp. 1-11, Feb. 2008.

*Primary Examiner* — Yogesh K Aggarwal
(74) *Attorney, Agent, or Firm* — Michael Best & Friedrich LLP

(57) ABSTRACT

Erroneous detection caused by flicker is suppressed in a solid-state imaging element that detects an address event. solid-state imaging element includes a plurality of pixels, a current detection unit, and a threshold control unit. In the solid-state imaging element, each of the plurality of pixels compares an amount of change in a voltage corresponding to a photocurrent with a predetermined threshold. Further, the current detection unit detects a sum of the photocurrents of the respective plurality of pixels as a total current. Further, the threshold control unit controls the predetermined threshold to a value corresponding to the total current detected by the current detection unit.

17 Claims, 26 Drawing Sheets

(51) Int. Cl.
*G06K 9/03* (2006.01)
*G06K 9/20* (2006.01)

(56) References Cited

FOREIGN PATENT DOCUMENTS

| | | | |
|---|---|---|---|
| JP | 2016-501495 A | 1/2016 | |
| JP | 2017-521746 A | 8/2017 | |

* cited by examiner a b a b a b a b

SOLID-STATE IMAGING ELEMENT, IMAGING APPARATUS, AND METHOD OF CONTROLLING SOLID-STATE IMAGING ELEMENT

TECHNICAL FIELD

The present technology relates to a solid-state imaging element, an imaging apparatus, and a method of controlling the solid-state imaging element. More specifically, the present technology relates to a solid-state imaging element that detects a change in luminance, an imaging apparatus, and a method of controlling the solid-state imaging element.

BACKGROUND ART

A synchronous solid-state imaging element that captures image data in synchronization with a synchronization signal such as a vertical synchronization signal has been conventionally used in an imaging apparatus or the like. This general synchronous solid-state imaging element can acquire image data only at each period of the synchronization signal (e.g., 1/60 second). Thus, it is difficult to perform higher-speed processing in a case where such processing is required in traffic, robot, and other fields. In view of this, there has been proposed an asynchronous solid-state imaging element that detects an address event in each pixel by using a certain threshold (e.g., see Patent Document 1). Herein, the wording "address event" means that luminance of a pixel changes at a certain pixel address and an amount of the change exceeds a threshold. Such a solid-state imaging element that detects an address event in each pixel as described above is called dynamic vision sensor (DVS).

CITATION LIST

Patent Document

Patent Document 1: Japanese Patent Application Laid-Open No. 2009-508085

SUMMARY OF THE INVENTION

Problems to be Solved By the Invention

The above related art can generate and output data at a much higher speed than a synchronous solid-state imaging element. For this reason, for example, in the traffic field, it is possible to execute processing of recognizing an image of a person or obstacle at a high speed, thereby improving safety. However, under a light source such as a fluorescent lamp where flicker occurs, the above DVS may erroneously detect a change in luminance caused by the flicker as an address event. Further, the erroneous detection causes noise in image data, which is problematic.

The present technology has been made in view of such a circumstance, and an object thereof is to suppress erroneous detection caused by flicker in a solid-state imaging element that detects an address event.

Solutions to Problems

The present technology has been made to solve the above problems, and a first aspect thereof is
a solid-state imaging element and a method of controlling the same, the solid-state imaging element including: a plurality of pixels, each of which is configured to compare an amount of change in a voltage corresponding to a photocurrent with a predetermined threshold; a current detection unit configured to detect a sum of the photocurrents of the respective plurality of pixels as a total current; and a threshold control unit configured to control the predetermined threshold to a value corresponding to the total current. With this configuration, the threshold can be controlled to a value corresponding to the total current.

Further, in the first aspect, the threshold control unit may include an adjustment unit configured to adjust the total current and output the total current as an adjustment current, an offset current source configured to generate a predetermined offset current, and a conversion unit configured to convert a sum or difference between the adjustment current and the predetermined offset current into the predetermined threshold and supply the threshold to each of the plurality of pixels. With this configuration, the sum or difference between the current obtained by adjusting the total current and the offset current can be converted into the threshold.

Further, in the first aspect, the offset current source may include a reference current source configured to generate a predetermined reference current, a first distribution circuit configured to distribute the predetermined reference current at a plurality of different ratios to generate a plurality of distribution currents, and a first decoder configured to control the first distribution circuit and output a sum of a predetermined number of the plurality of distribution currents as the predetermined offset current. With this configuration, the sum of the distribution currents obtained by distributing the reference current can be output as the offset current.

Further, in the first aspect, the adjustment unit may include a second distribution circuit configured to distribute the total current at a plurality of different ratios to generate a plurality of distribution currents, and a second decoder configured to control the second distribution circuit and output a sum of a predetermined number of the plurality of distribution currents as the adjustment current. With this configuration, the sum of the distribution currents obtained by distributing the total current can be output as the adjustment current.

Further, in the first aspect, the conversion unit may include a plurality of resistance elements, and a third decoder configured to connect a predetermined number of the plurality of resistance elements in parallel and output a voltage generated by the adjustment current flowing through a combined resistance of the predetermined number of resistance elements as the predetermined threshold. With this configuration, the voltage generated in the combined resistance can be output as the threshold.

Further, in the first aspect, the current detection unit can also detect a sum of the photocurrents of some of the plurality of pixels as the total current. With this configuration, the threshold can be controlled to a value corresponding to the sum of the photocurrents of some of the pixels.

Further, in the first aspect, the threshold control unit may control the predetermined threshold to a higher value as the total current is larger. With this configuration, the threshold can be controlled to a higher value as the total current is larger.

Further, in the first aspect, the predetermined threshold may include an upper threshold and a lower threshold that are different from each other, and each of the plurality of pixels may detect that the amount of change exceeds the upper threshold as an on event, and detect that the amount of change falls below the lower threshold as an off event. With this configuration, the on event and the off event can be detected in each pixel.

Further, a second aspect of the present technology is an imaging apparatus including: a plurality of pixels, each of which is configured to compare an amount of change in a voltage corresponding to a photocurrent with a predetermined threshold; a current detection unit configured to detect a sum of the photocurrents of the respective plurality of pixels as a total current; a threshold control unit configured to control the predetermined threshold to a value corresponding to the total current; and a signal processing unit configured to process a signal including a comparison result of each of the plurality of pixels. With this configuration, a signal including a result of comparison between the threshold corresponding to the total current and the photocurrent can be processed.

Effects of the Invention

The present technology has an excellent effect of suppressing erroneous detection caused by flicker in a solid-state imaging element that detects an address event. Note that the effects described herein are not necessarily limited, and may be any of the effects described in the present disclosure.

MODE FOR CARRYING OUT THE INVENTION

Hereinafter, modes for carrying out the present technology (hereinafter, referred to as "embodiments") will be described. Description will be made in the following order.
1. First embodiment (example of controlling threshold in accordance with total current)
2. Second embodiment (example of controlling offset current to control threshold in accordance with total current)
3. Examples of application to moving objects 1. First Embodiment

Figure 1:
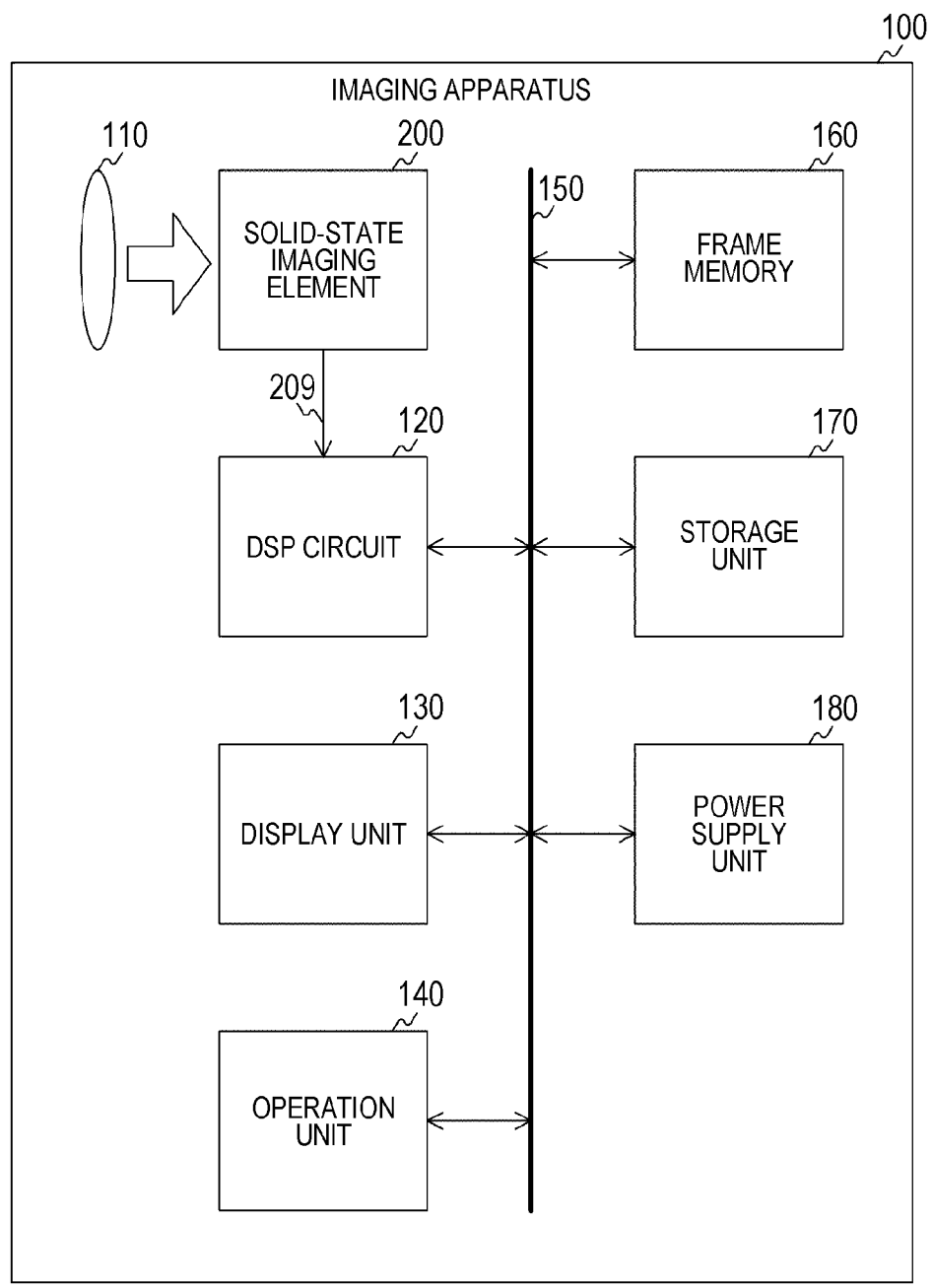
FIG. 1 is a block diagram showing a configuration example of an imaging apparatus in a first embodiment of the present technology.

[Configuration Example of Imaging Apparatus]
FIG. 1 is a block diagram showing a configuration example of an imaging apparatus 100 according to a first embodiment of the present technology. The imaging apparatus 100 is an apparatus for capturing image data and includes an optical unit 110, a solid-state imaging element 200, and a digital signal processing (DSP) circuit 120. The imaging apparatus 100 further includes a display unit 130, an operation unit 140, a bus 150, a frame memory 160, a storage unit 170, and a power supply unit 180. The imaging apparatus 100 is assumed to be a camera mounted on an industrial robot, an in-vehicle camera, or the like.

The optical unit 110 collects light from a subject and guides the light to the solid-state imaging element 200. The solid-state imaging element 200 detects, as an address event, that an absolute value of an amount of change in luminance exceeds an absolute value of a threshold in each pixel. The address event includes, for example, an on event indicating that an amount of positive change in luminance exceeds a positive threshold and an off event indicating that an amount of negative change falls below a negative threshold. The solid-state imaging element 200 generates image data indicating presence or absence of each of the on and off events for each pixel by using 2-bit data, and supplies the image data to the DSP circuit 120 via a signal line 209.

The DSP circuit 120 executes predetermined signal processing with respect to the image data supplied from the solid-state imaging element 200. The DSP circuit 120 outputs the processed image data and event data to the frame memory 160 and the like via the bus 150. Note that the DSP circuit 120 is an example of a signal processing unit recited in the claims.

The display unit 130 displays image data and event data. The display unit 130 is assumed to be, for example, a liquid crystal panel or an organic electro luminescence (EL) panel. The operation unit 140 generates an operation signal in response to user operation.

The bus 150 is a common path through which the optical unit 110, the solid-state imaging element 200, the DSP circuit 120, the display unit 130, the operation unit 140, the frame memory 160, the storage unit 170, and the power supply unit 180 exchange data with each other.

The frame memory 160 holds image data. The storage unit 170 stores various kinds of data such as image data. The power supply unit 180 supplies power to the solid-state imaging element 200, the DSP circuit 120, the display unit 130, and the like.

Note that there may be a plurality of solid-state imaging elements 200, and there may be a plurality of solid-state hearing apparatuses called silicone inner ears (coherers).

[Configuration Example of Solid-State Imaging Element]

Figure 2:
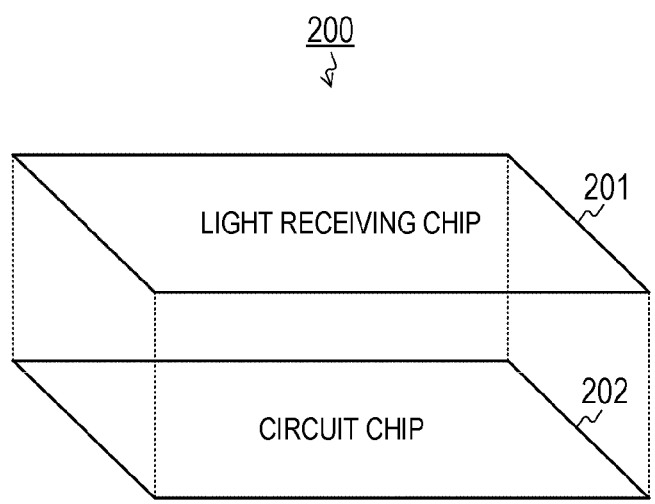
FIG. 2 shows a layered structure of the solid-state imaging element in the first embodiment of the present technology.

FIG. 2 shows an example of a layered structure of the solid-state imaging element 200 in the first embodiment of the present technology. The solid-state imaging element 200 includes a light receiving chip 201 and a circuit chip 202 layered on the light receiving chip 201.

Figure 3:
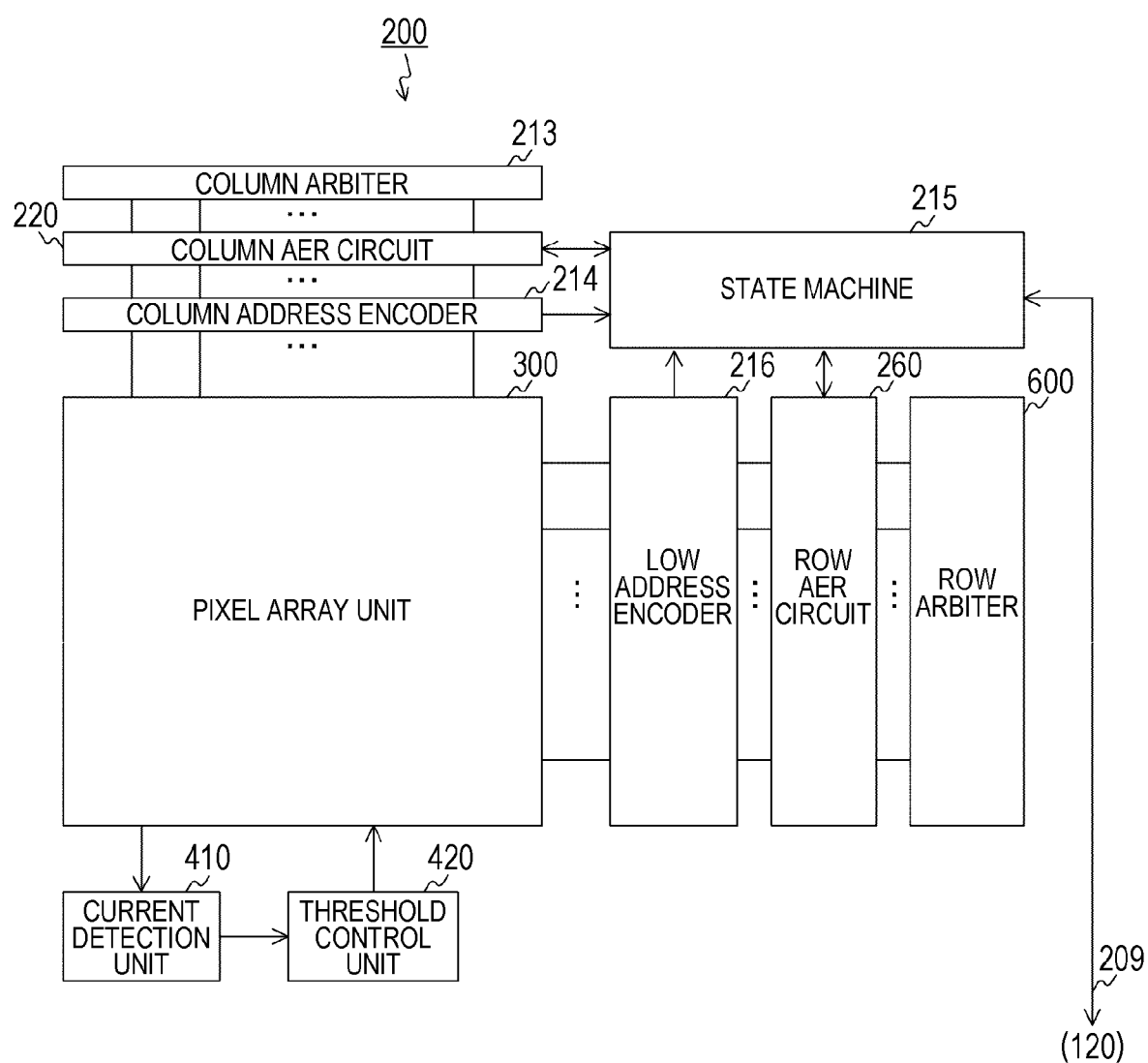
FIG. 3 is a block diagram showing a configuration example of the solid-state imaging element in the first embodiment of the present technology.

FIG. 3 is a block diagram showing a configuration example of the solid-state imaging element 200 in the first embodiment of the present technology. The solid-state imaging element 200 includes a column arbiter 213, a column AER circuit 220, a column address encoder 214, a pixel array unit 300, and a state machine 215. Further, the solid-state imaging element 200 includes a row address encoder 216, a row AER circuit 260, a row arbiter 600, a current detection unit 410, and a threshold control unit 420. In addition, in a pixel array unit 300, a plurality of pixels is arrayed in a two-dimensional lattice. Hereinafter, a set of pixels arrayed in a predetermined direction in the pixel array unit 300 will be referred to as "row", and a set of pixels arrayed in a direction perpendicular to the row will be referred to as "column".

Each of the pixels in the pixel array unit 300 generates a differential signal indicating an amount of change in a voltage corresponding to a photocurrent, and compares a level of the signal with a predetermined threshold. A comparison result thereof indicates a detection result of an address event. Herein, the threshold to be compared with the differential signal includes two different thresholds, and a larger one thereof is set as an upper threshold and a smaller one is set as a lower threshold. Further, the address event includes an on event and an off event, and the detection result thereof includes a 1-bit on-event detection result and a 1-bit off-event detection result. The on event is detected when the differential signal exceeds the upper threshold, and the off event is detected when the differential signal falls below the lower threshold.

When the pixel detects an address event, the pixel performs transmission of a request and reception of a response (hereinafter, referred to as "handshake") to/from the row AER circuit 260 in order to output a detection result of the address event to the outside. Then, the pixel performs a handshake with the column AER circuit 220.

The column arbiter 213 arbitrates a request from the column AER circuit 220 and transmits a response to the column AER circuit 220 on the basis of an arbitration result.

The column AER circuit 220 performs transmission of a request for requesting output of the detection result of the address event to the outside and reception of a response (handshake) to/from each column, the column arbiter 213, and the state machine 215.

The column address encoder 214 encodes an address of a column in which the address event occurs and transmits the encoded address to the state machine 215.

The row address encoder 216 encodes an address of a row in which the address event occurs and transmits the encoded address to the state machine 215.

The row arbiter 600 arbitrates a request from the row AER circuit 260 and transmits a response to the row AER circuit 260 on the basis of an arbitration result.

The row AER circuit 260 performs transmission of a request for requesting output of the detection result of the address event to the outside and reception of a response (handshake) to/from each row, the row arbiter 600, and the state machine 215.

The state machine 215 performs a handshake with the column AER circuit 220 and the row AER circuit 260. Upon receipt of requests from the column AER circuit 220 and the row AER circuit 260, the state machine 215 decodes data from the column address encoder 214 and the row address encoder 216, and specifies an address at which the address event is detected. By arraying the detection results of the address events in the respective pixels in a two-dimensional lattice, image data is generated. The state machine 215 supplies the image data to the DSP circuit 120.

The current detection unit 410 detects the sum of the photocurrents of all the pixels as a total current and supplies the total current to the threshold control unit 420. The threshold control unit 420 controls the upper threshold and the lower threshold to values corresponding to the total current. For example, the thresholds are controlled to higher values as the total current is larger.

Figure 4:
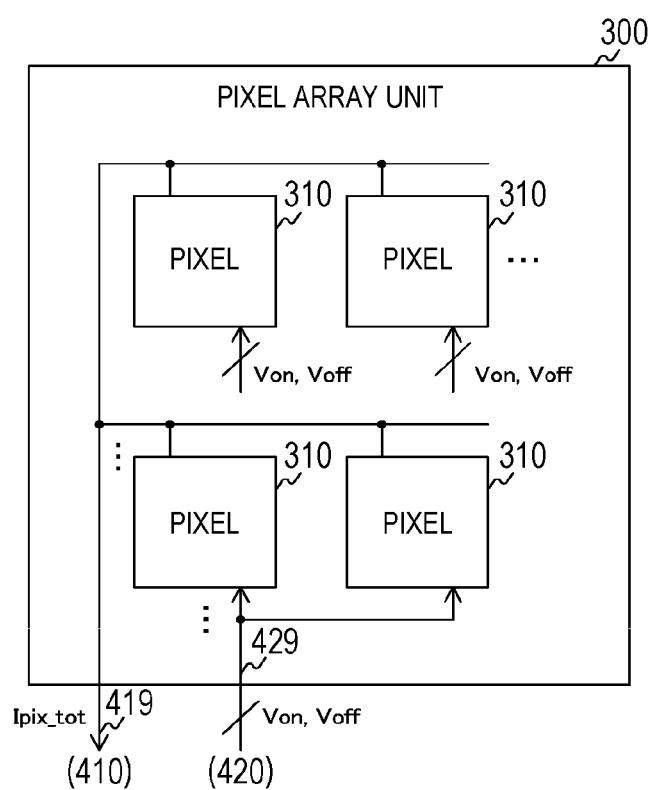
FIG. 4 is a block diagram showing a configuration example of a pixel array unit in the first embodiment of the present technology.

FIG. 4 is a block diagram showing a configuration example of the pixel array unit 300 in the first embodiment of the present technology. In the pixel array unit 300, a plurality of pixels 310 is arrayed in a two-dimensional lattice. Each of the pixels 310 is connected in common to the current detection unit 410 via a signal line 419. The signal line 419 branches at each row and further branches at each column to be connected to each pixel 310.

Each pixel 310 photoelectrically converts incident light to generate a photocurrent, and supplies the photocurrent to the current detection unit 410 via the signal line 419. Because the signal line 419 branches at each row and each column, currents in each row and each column merge at a branch source, and a total current Ipix_tot that is the sum of the currents is supplied to the current detection unit 410.

Further, each pixel 310 is connected in common to the threshold control unit 420 via a signal line 429. The threshold control unit 420 supplies an upper threshold Von and a lower threshold Voff to each pixel 310 via the signal line 429.

[Configuration Example of Pixel]

Figure 5:
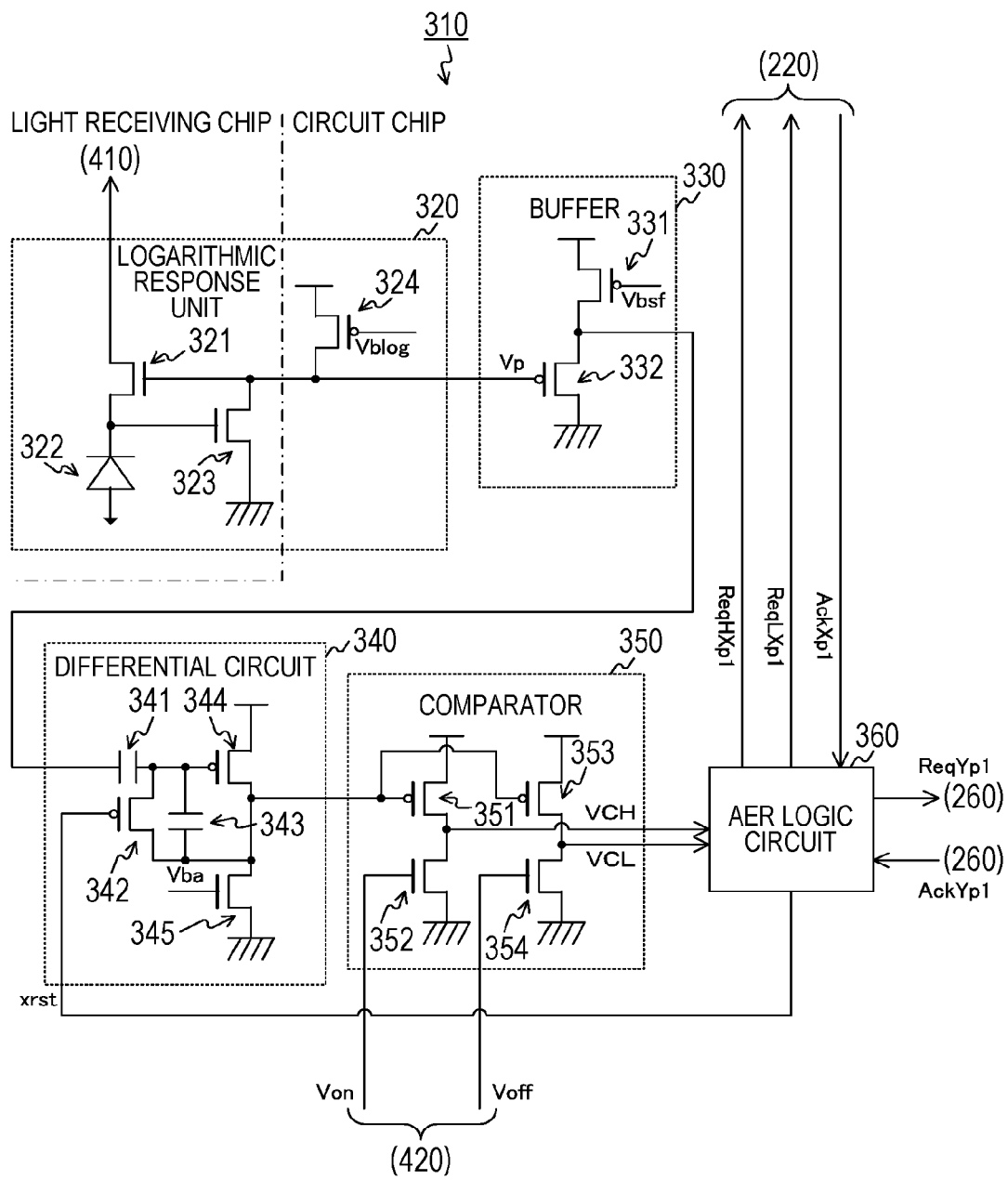
FIG. 5 is a circuit diagram showing a configuration example of a pixel in the first embodiment of the present technology.

FIG. 5 is a circuit diagram showing a configuration example of the pixel 310 in the first embodiment of the present technology. The pixel 310 includes a logarithmic response unit 320, a buffer 330, a differential circuit 340, a comparator 350, and an AER logic circuit 360.

The logarithmic response unit 320 includes negative channel MOS (nMOS) transistors 321 and 323, a photodiode 322, and a positive channel MOS (pMOS) transistor 324.

The photodiode 322 generates a photocurrent by photoelectrically converting incident light. The pMOS transistor 324 and the nMOS transistor 323 are connected in series between a power supply and a ground terminal. Further, a gate of the nMOS transistor 321 is connected to a connection point between the pMOS transistor 324 and the nMOS transistor 323, a source thereof is connected to the photodiode 322, and a drain thereof is connected to the current detection unit 410. In addition, a bias voltage Vblog is applied to a gate of the pMOS transistor 324. With such a connection, the photocurrent flowing through the photodiode 322 is logarithmically converted into a voltage Vp.

Further, the photodiode 322 and the nMOS transistors 321 and 323 are arranged on the light receiving chip 201. Meanwhile, circuits of and after the pMOS transistor 324 are arranged on the circuit chip 202.

Further, the buffer 330 includes pMOS transistors 331 and 332 connected in series between the power supply and a ground terminal. A gate of the ground-side pMOS transistor 332 is connected to the logarithmic response unit 320, and a bias voltage Vbsf is applied to a gate of the power-supplyside pMOS transistor 331. Further, a connection point between the pMOS transistors 331 and 332 is connected to the differential circuit 340. With this connection, impedance conversion is performed on Vp.

The differential circuit 340 includes capacitors 341 and 343, pMOS transistors 342 and 344, and an nMOS transistor 345.

One end of the capacitor 341 is connected to the buffer 330, and the other end is connected to one end of the capacitor 343 and a gate of the pMOS transistor 344. A reset signal xrst is input to a gate of the pMOS transistor 342, and a source and drain thereof are connected to both ends of the capacitor 343. The pMOS transistor 344 and the nMOS transistor 345 are connected in series between the power supply and a ground terminal. Further, the other end of the capacitor 343 is connected to a connection point between the pMOS transistor 344 and the nMOS transistor 345. A bias voltage Vba is applied to a gate of the ground-side nMOS transistor 345, and the connection point between the pMOS transistor 344 and the nMOS transistor 345 is also connected to the comparator 350. With such a connection, a differential signal is generated and output to the comparator 350. Further, the differential signal is initialized by the reset signal xrst.

The comparator 350 includes pMOS transistors 351 and 353 and nMOS transistors 352 and 354. The pMOS transistor 351 and the nMOS transistor 352 are connected in series between the power supply and a ground terminal, and the pMOS transistor 353 and the nMOS transistor 354 are also connected in series between the power supply and a ground terminal. Further, gates of the pMOS transistors 351 and 353 are connected to the differential circuit 340. The upper threshold Von from the threshold control unit 420 is applied to a gate of the nMOS transistor 352, and the lower threshold Voff from the threshold control unit 420 is applied to a gate of the nMOS transistor 354.

A connection point between the pMOS transistor 351 and the nMOS transistor 352 is connected to the AER logic circuit 360, and a voltage at the connection point is output as a comparison result VCH. A connection point between the pMOS transistor 353 and the nMOS transistor 354 is also connected to the AER logic circuit 360, and a voltage at the connection point is output as a comparison result VCL. With such a connection, the comparator 350 outputs the highlevel comparison result VCH in a case where the differential signal exceeds the upper threshold Von, and outputs the low-level comparison result VCL in a case where the differential signal falls below the lower threshold Voff. The comparison result VCH indicates a detection result of an on event, and the comparison result VCL indicates a detection result of an off event.

Note that, although the comparator 350 detects both the on event and the off event, the comparator 350 may detect only one of the on and off events. For example, in order to detect only the on event, only the pMOS transistor 351 and nMOS transistor 352 corresponding thereto are arranged.

The AER logic circuit 360 performs a handshake on the basis of the comparison results VCH and VCL. The AER logic circuit 360 performs a handshake with the row AER circuit 260 in a case where an address event occurs. Then, the AER logic circuit 360 performs a handshake with the column AER circuit 220, and resets the differential circuit 340 by using the reset signal xrst.

Note that, although the photodiode 322 and the nMOS transistors 321 and 323 are arranged on the light receiving chip 201, and the other circuits are arranged on the circuit chip 202, the circuits to be arranged on each chip are not limited to this configuration. For example, only the photodiode 322 can be arranged on the light receiving chip 201, and the other circuits can be arranged on the circuit chip 202. Further, the logarithmic response unit 320 can be arranged on the light receiving chip 201, and the other circuits can be arranged on the circuit chip 202. Further, the logarithmic response unit 320 and the buffer 330 can be arranged on the light receiving chip 201, and the other circuits can be arranged on the circuit chip 202. Further, the logarithmic response unit 320, the buffer 330, and the capacitor 341 can be arranged on the light receiving chip 201, and the other circuits can be arranged on the circuit chip 202. Further, the logarithmic response unit 320, the buffer 330, the differential circuit 340, and the comparator 350 can be arranged on the light receiving chip 201, and the other circuits can be arranged on the circuit chip 202.

Figure 6:
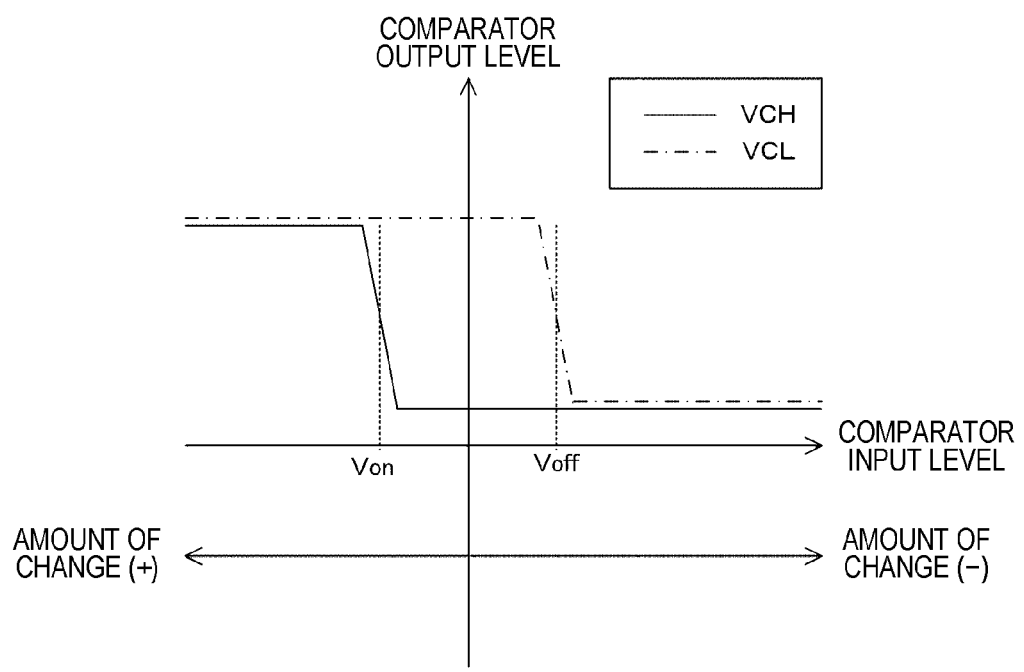
FIG. 6 is a graph showing an example of input/output characteristics of a comparator in the first embodiment of the present technology.

FIG. 6 is a graph showing an example of input/output characteristics of the comparator 350 in the first embodiment of the present technology. In FIG. 6, the vertical axis represents a level of an output signal (VCH or VCL) of the comparator 350, and the horizontal axis represents a level of an input signal (differential signal) of the comparator 350. Further, the solid line represents a locus of the comparison result VCH, and the long dashed short dashed line represents a locus of the comparison result VCL.

When an amount of change in a voltage depending on luminance (i.e., a differential signal) exceeds the upper threshold Von, the comparison result VCH changes from a low level to a high level, and an on event is detected. Meanwhile, when the differential signal falls below the lower threshold Voff, the comparison result VCL changes from a high level to a low level, and an off event is detected.

[Configuration Example of Current Detection Unit and Threshold Control Unit]

Figure 7:
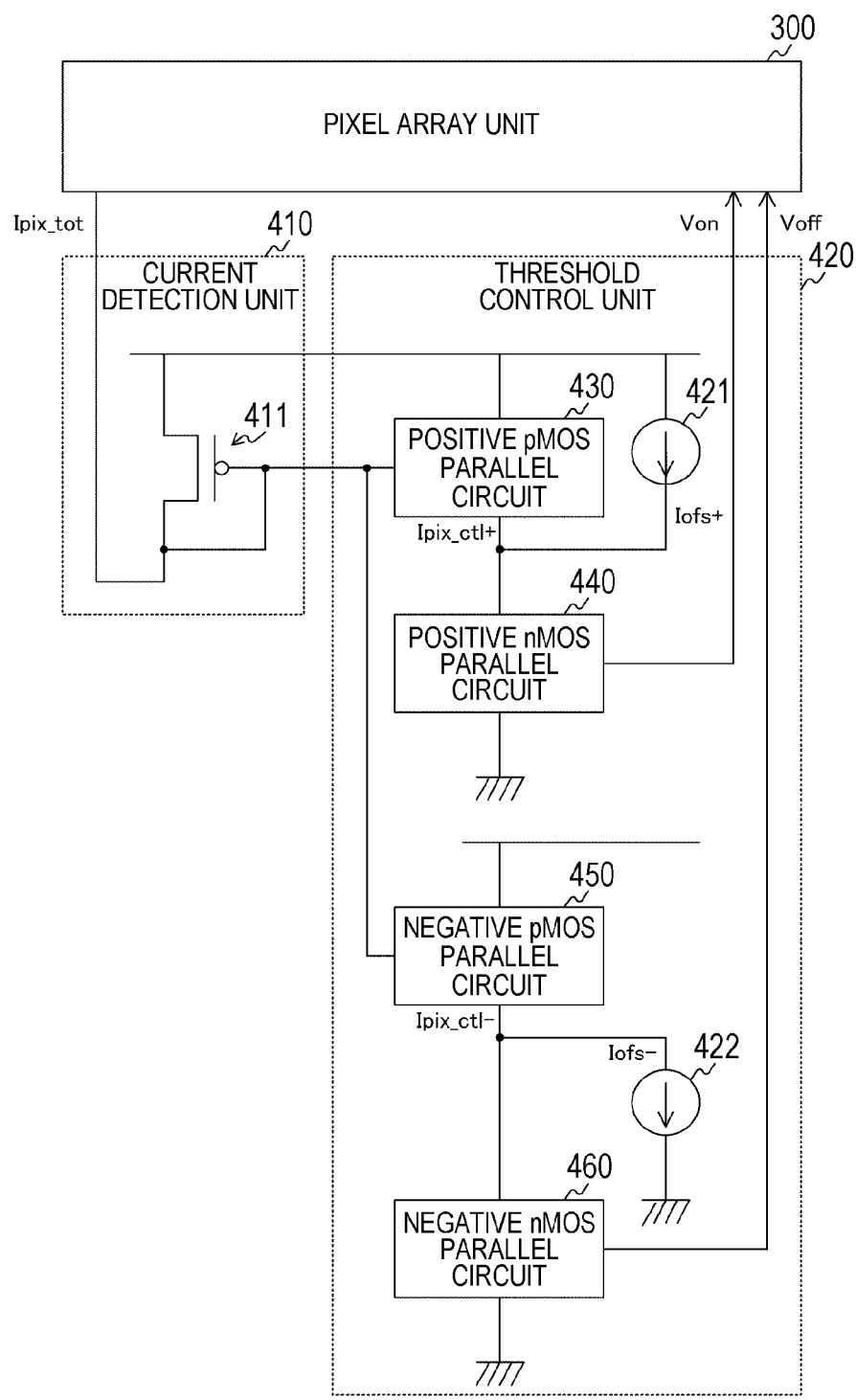
FIG. 7 is a block diagram showing a configuration example of a current detection unit and a threshold control unit in the first embodiment of the present technology.

FIG. 7 is a block diagram showing a configuration example of the current detection unit 410 and the threshold control unit 420 in the first embodiment of the present technology. The current detection unit 410 includes a pMOS transistor 411. Further, the threshold control unit 420 includes a positive pMOS parallel circuit 430, a positive nMOS parallel circuit 440, a negative pMOS parallel circuit 450, a negative nMOS parallel circuit 460, a positive offset current source 421, and a negative offset current source 422.

The pMOS transistor 411 detects the total current Ipix_tot. A gate of the pMOS transistor 411 is connected to the positive pMOS parallel circuit 430 and the negative pMOS parallel circuit 450. A source thereof is connected to the power supply, and a drain thereof is connected to the pixel array unit 300. Further, the gate and drain of the pMOS transistor 411 are short-circuited.

The positive pMOS parallel circuit 430 adjusts the total current Ipix_tot and outputs the adjusted total current to the positive nMOS parallel circuit 440 as an adjustment current Ipix_ctl+. The positive offset current source 421 generates a constant current as an offset current Iofs+, and supplies the offset current to the positive nMOS parallel circuit 440.

The positive nMOS parallel circuit 440 converts the sum of the adjustment current Ipix_ctl+ and the offset current Iofs+ into a voltage, and supplies the voltage to the pixel array unit 300 as the upper threshold Von.

The negative pMOS parallel circuit 450 adjusts the total current Ipix_tot and outputs the adjusted total current to the negative nMOS parallel circuit 460 as an adjustment current Ipix_ctl−. The negative offset current source 422 generates a constant current as an offset current Iofs−. Note that the positive pMOS parallel circuit 430 and the negative pMOS parallel circuit 450 are examples of an adjustment unit in the claims. Further, the positive offset current source 421 and the negative offset current source 422 are examples of an offset current source recited in the claims.

The negative nMOS parallel circuit 460 converts a difference between the adjustment current Ipix_ctl− and the offset current Iofs− into a voltage, and supplies the voltage to the pixel array unit 300 as the lower threshold Voff. Note that the positive nMOS parallel circuit 440 and the negative nMOS parallel circuit 460 are examples of a conversion unit recited in the claims.

With the above configuration, the threshold control unit 420 controls the upper threshold Von and the lower threshold Voff to higher values as the total current Ipix_tot is larger.

Note that each pixel in the pixel array unit 300 detects both an on event and an off event, but may detect only one of the on and off events. For example, in a case where the pixel detects only the on event, only the positive pMOS parallel circuit 430, positive nMOS parallel circuit 440, and positive offset current source 421 corresponding thereto are arranged in the threshold control unit 420.

Further, the current detection unit 410 detects the sum of the photocurrents of all the pixels as the total current Ipix_tot, but can also detect the sum of the photocurrents of some of the pixels in the pixel array unit 300 as the total current Ipix_tot. For example, the pixel array unit 300 may be divided into a plurality of areas each of which has two or more pixels, and, in each area, only one pixel in the area may output a photocurrent to the current detection unit 410. With this configuration, it is possible to reduce the number of branch points of the signal line 419, as compared with a case of detecting the sum of the photocurrents of all the pixels.

[Configuration Example of Positive pMOS Parallel Circuit]

Figure 8:
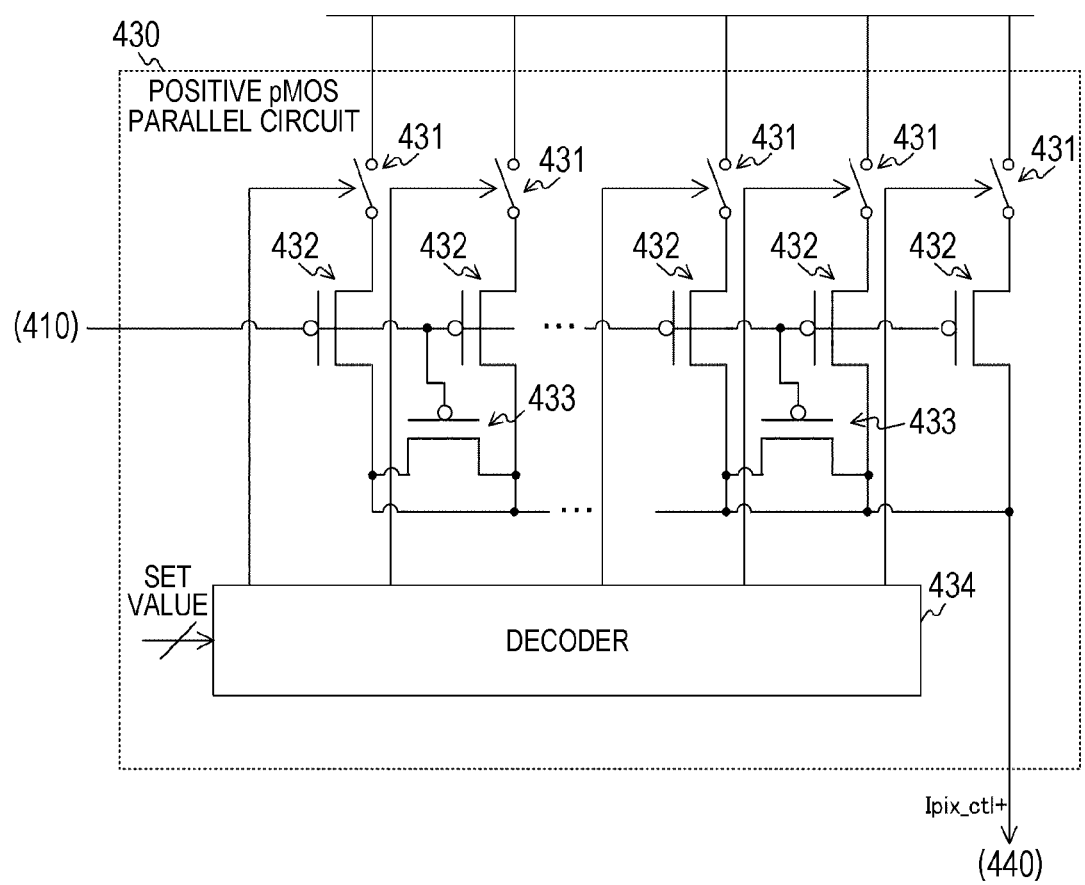
FIG. 8 is a circuit diagram showing a configuration example of a positive pMOS parallel circuit in the first embodiment of the present technology.

FIG. 8 is a circuit diagram showing a configuration example of the positive pMOS parallel circuit 430 in the first embodiment of the present technology. The positive pMOS parallel circuit 430 includes m+1 (m is an integer) switches 431, m+1 pMOS transistors 432, m−1 pMOS transistors 433, and a decoder 434. Note that a configuration of the negative pMOS parallel circuit 450 is similar to that of the positive pMOS parallel circuit 430.

The switches 431 are associated with the different pMOS transistors 432. Each of the switches 431 opens and closes a path between a source of the corresponding transistor and the power supply under the control of the decoder 434.

A gate of each of the pMOS transistors 432 is connected to the gate of the pMOS transistor 411 in the current detection unit 410. Further, drains of the pMOS transistors 432 are connected in common to the positive nMOS parallel circuit 440.

A gate of each of the pMOS transistors 433 is connected to the drain of the pMOS transistor 411 in the current detection unit 410. Further, a source and drain of the mth pMOS transistor 433 are connected to drains of the mth and (m+1)th pMOS transistors 432, respectively.

The decoder 434 controls each switch 431 in accordance with a predetermined set value held in a register or the like in advance.

Each pMOS transistor 432 forms a current mirror circuit with the pMOS transistor 411. Those current mirror circuits can generate a plurality of distribution currents by distributing the total current at a distribution ratio according to a gate width and gate length of each transistor. Note that a circuit including the m+1 switches 431, the m+1 pMOS transistors 432, and the m−1 pMOS transistors 433 is an example of a second distribution circuit recited in the claims.

For example, a gate width W and a gate length L of each of the pMOS transistor 411 and the first to mth pMOS transistors 432 are set to values satisfying the following expression.

$$W/L = (N-1) \times \alpha \qquad \text{Expression 1}$$

The gate width W and the gate length L of the (m+1)th pMOS transistor 432 are set to values satisfying the following expression.

$$W/L = \alpha \qquad \text{Expression 2}$$

Further, the gate width W and the gate length L of the pMOS transistor 433 are set to values satisfying the following expression.

$$W/L = N \times \alpha/(N-1) \qquad \text{Expression 3}$$

In a case where the gate width W and gate length L satisfying Expressions 1 to 3 are set, a distribution current $I_m$ flowing through the first to mth pMOS transistors 432 is expressed by the following expression.

$$I_m = I\text{pix\_tot}/N^{m-1} \qquad \text{Expression 4}$$

Further, a distribution current $I_{m+1}$ flowing through the (m+1)th pMOS transistor 432 is expressed by the following expression.

$$I_{m+1} = I\text{pix\_tot}/\{N^{m-1}(N-1)\} \qquad \text{Expression 5}$$

When the decoder 434 opens and closes each switch 431 in accordance with the set value, it is possible to control the adjustment current Ipix_ctl+ on the order of sub-picoampere on the basis of Expressions 4 and 5. For example, in a case where the first and (m+1)th switches 431 are closed and the remaining switches are open, the adjustment current Ipix_ctl+ can be controlled to the sum of the distribution currents $I_1$ and $I_{m+1}$. Note that the decoder 434 is an example of a second decoder in the claims. Further, the configuration of the positive pMOS parallel circuit 430 is not limited to the circuit shown in FIG. 8, as long as the positive pMOS parallel circuit 430 can adjust the total current.

[Configuration Example of Positive nMOS Parallel Circuit]

Figure 9:
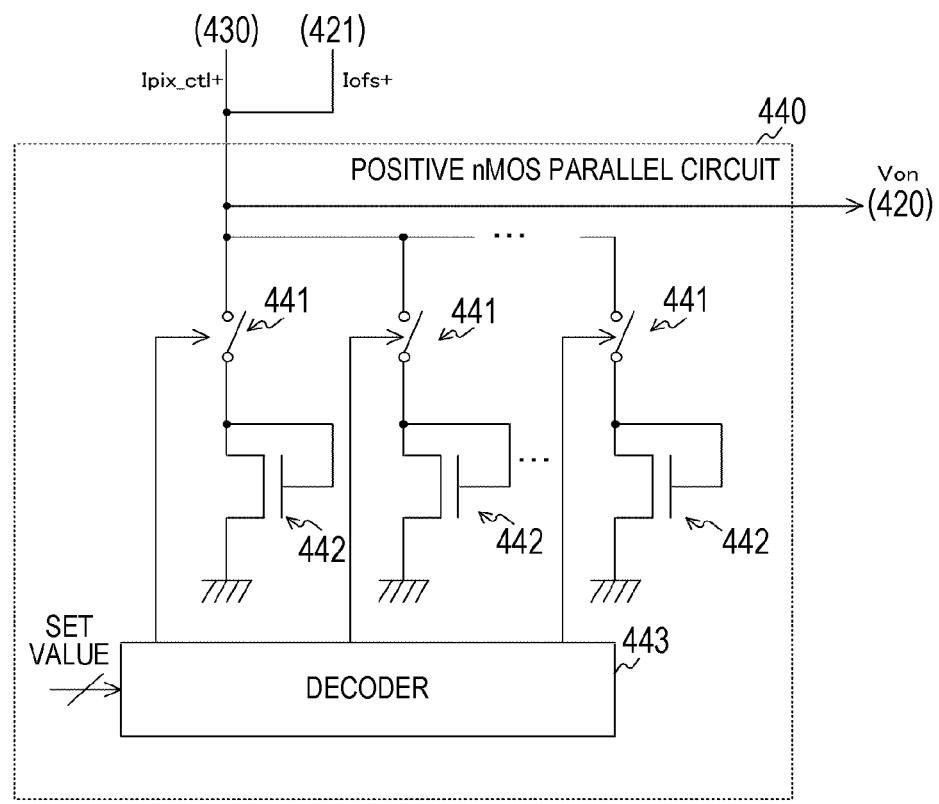
FIG. 9 is a circuit diagram showing a configuration example of a positive nMOS parallel circuit in the first embodiment of the present technology.

FIG. 9 is a circuit diagram showing a configuration example of the positive nMOS parallel circuit 440 in the first embodiment of the present technology. The positive nMOS parallel circuit 440 includes n (n is an integer) switches 441, n nMOS transistors 442, and a decoder 443. Note that a configuration of the negative nMOS parallel circuit 460 is similar to that of the positive nMOS parallel circuit 440.

The switches 441 are associated with the different nMOS transistors 442, respectively. One end of each of the switches 441 is connected to the positive pMOS parallel circuit 430 and the positive offset current source 421, and the other end is connected to a drain of the corresponding nMOS transistor 442.

A gate and drain of each nMOS transistor 442 are short-circuited, and are in a so-called diode connection state. Note that the nMOS transistor 442 is an example of a resistance element recited in the claims.

The decoder 443 controls each switch 441 in accordance with a predetermined set value held in a register or the like in advance.

When the decoder 443 opens and closes each switch 441 in accordance with the set value, it is possible to control a combined resistance of the diode-connected n nMOS transistors 442. Then, a voltage, which is generated by the sum of the adjustment current Ipix_ctl+ and the offset current Iofs+ flowing through the combined resistance, is output as the upper threshold Von. Note that the decoder 443 is an example of a third decoder in the claims. Further, the configuration of the positive nMOS parallel circuit 440 is not limited to the circuit shown in FIG. 9, as long as the positive nMOS parallel circuit 440 can generate the upper threshold Von by current-voltage conversion.

[Configuration Example of AER Logic Circuit]

Figure 10:
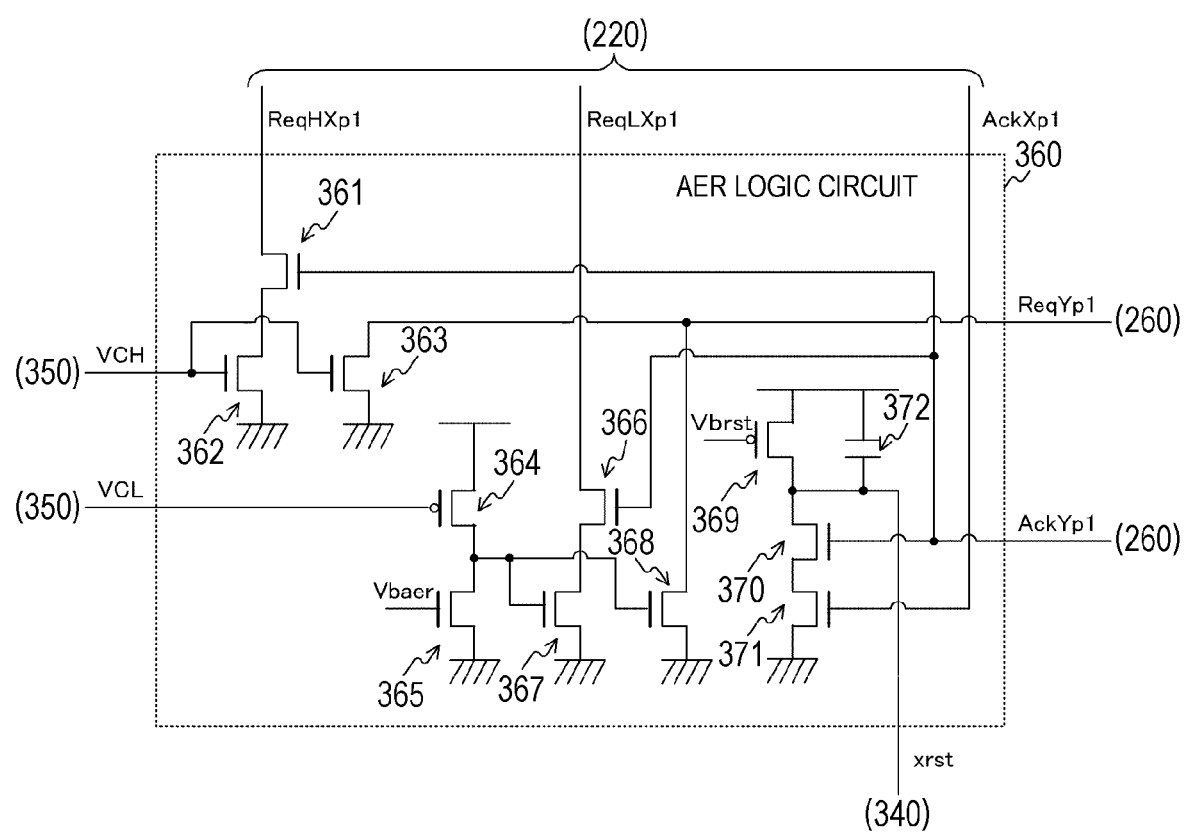
FIG. 10 is a circuit diagram showing a configuration example of an address event representation (AER) logic circuit in the first embodiment of the present technology.

FIG. 10 is a block diagram showing a configuration example of the AER logic circuit 360 in the first embodiment of the present technology. The AER logic circuit 360 includes nMOS transistors 361 to 363, 365 to 368, 370 and 371, pMOS transistors 364 and 369, and a capacitor 372.

The nMOS transistors 361 and 362 are connected in series. The comparison result VCH is input to gates of the nMOS transistors 362 and 363, and a response AckYp1 is input to a gate of the nMOS transistor 361. Further, sources of the nMOS transistors 362 and 363 are grounded, and a request ReqHXp1 is output from a drain of the nMOS transistor 361 to the column AER circuit 220. A request ReqYp1 is output from a drain of the nMOS transistor 363 to the row AER circuit 260.

The pMOS transistor 364 and the nMOS transistor 365 are connected in series between the power supply and a ground terminal. Further, the comparison result VCL is input to a gate of the pMOS transistor 364, and a bias voltage Vbaer is applied to a gate of the nMOS transistor 365.

The nMOS transistors 366 and 367 are connected in series. Gates of nMOS transistors 367 and 368 are connected to a connection point between the pMOS transistor 364 and the nMOS transistor 365. The response AckYp1 is input to a gate of the nMOS transistor 366. Further, sources of the nMOS transistors 367 and 368 are grounded, and a request ReqLXp1 is output from a drain of the nMOS transistor 366 to the column AER circuit 220. The request ReqYp1 is output from a drain of the nMOS transistor 368 to the row AER circuit 260.

The pMOS transistor 369 and the nMOS transistors 370 and 371 are connected in series between the power supply and a ground terminal. Further, a bias voltage Vbrst is applied to a gate of the pMOS transistor 369. The response AckYp1 is input to a gate of the nMOS transistor 370, and a response AckXp1 is input to a gate of the nMOS transistor 371. One end of the capacitor 372 is connected to the power supply, and the other end is connected to a connection point between the pMOS transistor 369 and the nMOS transistor 370. Further, a voltage at the connection point between the pMOS transistor 369 and the nMOS transistor 370 is output to the differential circuit 340 as the reset signal xrst.

With the above configuration, when the high-level comparison result VCH is input (i.e., an on event is detected), the AER logic circuit 360 transmits the low-level request ReqYp1 to the row AER circuit 260. Then, upon receipt of the high-level response AckYp1 from the row AER circuit 260, the AER logic circuit 360 transmits the low-level request ReqHXp1 to the column AER circuit 220. Thereafter, upon receipt of the high-level response AckXp1 from the column AER circuit 220, the AER logic circuit 360 outputs the low-level reset signal xrst to the differential circuit 340.

Further, when the low-level comparison result VCL is input (i.e., an off event is detected), the AER logic circuit 360 transmits the low-level request ReqYp1 to the row AER circuit 260. Then, upon receipt of the high-level response AckYp1 from the row AER circuit 260, the AER logic circuit 360 transmits the low-level request ReqLXp1 to the column AER circuit 220. Thereafter, upon receipt of the high-level response AckXp1 from the column AER circuit 220, the AER logic circuit 360 outputs the low-level reset signal xrst to the differential circuit 340.

[Configuration Example of Row AER Circuit]

Figure 11:
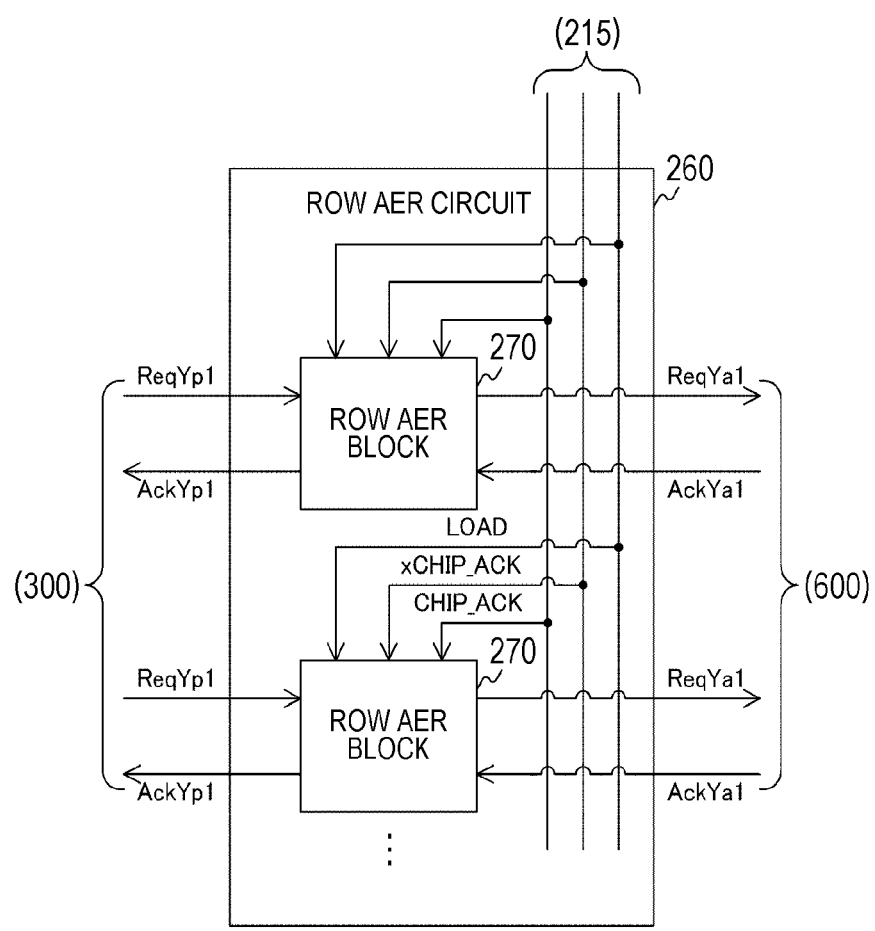
FIG. 11 is a block diagram showing a configuration example of a row AER circuit in the first embodiment of the present technology.

FIG. 11 is a block diagram showing a configuration example of the row AER circuit 260 in the first embodiment of the present technology. The row AER circuit 260 includes a row AER block 270 in each row. The row AER block 270 performs a handshake with the corresponding row, the row arbiter 600, and the state machine 215.

[Configuration Example of Row AER Block]

Figure 12:
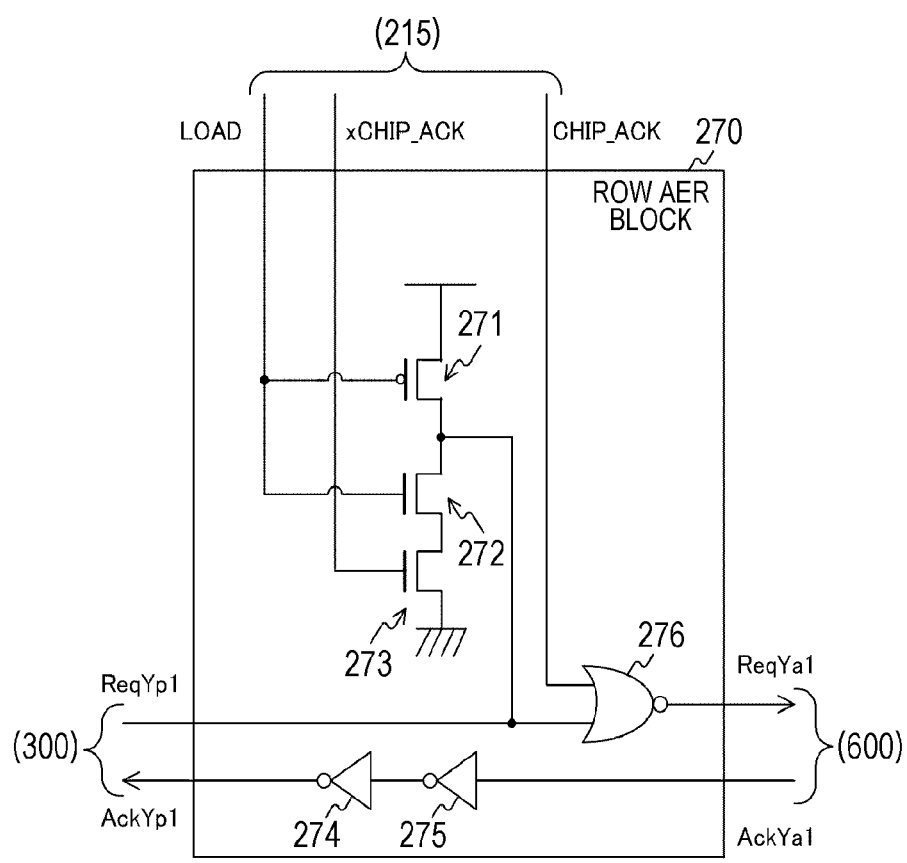
FIG. 12 is a block diagram showing a configuration example of a row AER block in the first embodiment of the present technology.

FIG. 12 is a circuit diagram showing a configuration example of the row AER block 270 in the first embodiment of the present technology. The row AER block 270 includes a pMOS transistor 271, nMOS transistors 272 and 273, a NOR gate 276, and inverters 274 and 275.

The pMOS transistor 271 and the nMOS transistors 272 and 273 are connected in series between the power supply and a ground terminal. Further, a control signal LOAD is input from the state machine 215 to gates of the pMOS transistor 271 and the nMOS transistor 272. The control signal LOAD is a signal for giving an instruction to read a detection result of an address event. Further, xCHIP_ACK, which is obtained by inverting a response CHIP_ACK from the state machine 215, is input to a gate of the nMOS transistor 273.

The NOR gate 276 outputs a NOR of two input values to the row arbiter 600 as a request ReqYa1. The response CHIP_ACK is input from the state machine 215 to one of input terminals of the NOR gate 276. The other input terminal of the NOR gate 276 is connected to a connection point between the pMOS transistor 271 and the nMOS transistor 272 and a signal line that transmits the request ReqYp1 from the pixel array unit 300.

The inverter 275 inverts the response AckYa1 from the row arbiter 600 and outputs the inverted response to the inverter 274. The inverter 274 inverts the signal from the inverter 275 and outputs the inverted signal to the pixel array unit 300 as the response AckYp1.

With the above configuration, when the low-level request ReqYp1 is input to the row AER block 270, the row AER block 270 outputs the low-level request ReqYa1 in a case where the response CHIP_ACK is at a high level. Further, the row AER block 270 delays the high-level response AckYa1 and outputs the high-level response as the response AckYp1.

[Configuration Example of Column AER Circuit]

Figure 13:
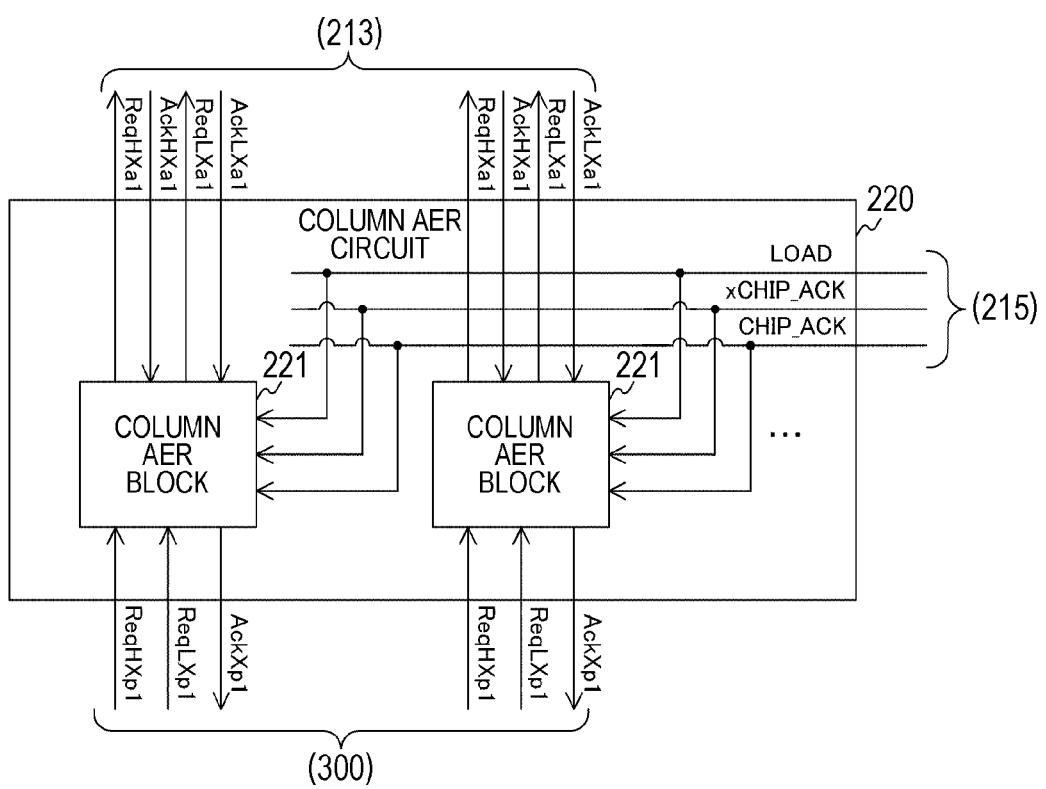
FIG. 13 is a block diagram showing a configuration example of a column AER circuit in the first embodiment of the present technology.

FIG. 13 is a block diagram showing a configuration example of the column AER circuit 220 in the first embodiment of the present technology. The column AER circuit 220 includes a column AER block 221 in each column. The column AER block 221 performs a handshake with the corresponding column, the state machine 215, and the column arbiter 213.

[Configuration Example of Column AER Block]

Figure 14:
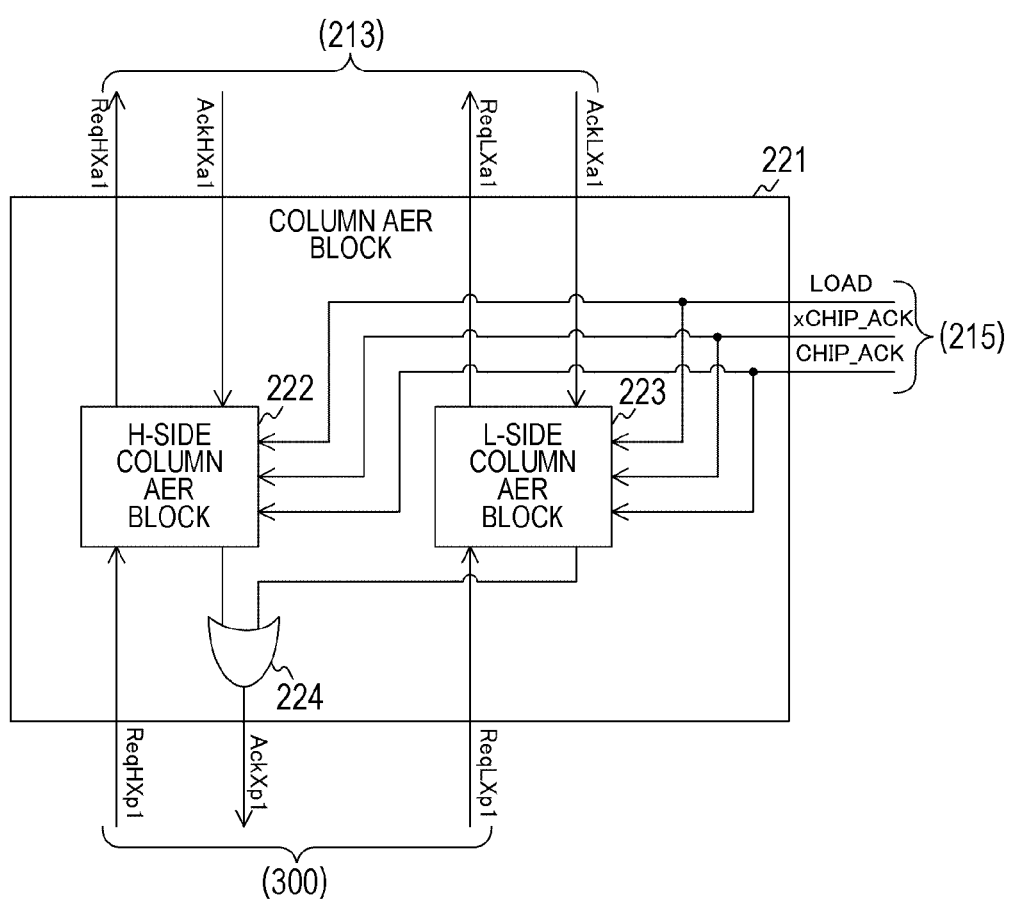
FIG. 14 is a block diagram showing a configuration example of a column AER block in the first embodiment of the present technology.

FIG. 14 is a block diagram showing a configuration example of the column AER block 221 in the first embodiment of the present technology. The column AER block 221 includes an H-side column AER block 222, an L-side column AER block 223, and an OR gate 224.

The H-side column AER block 222 performs a handshake when the low-level request ReqHXp1 is input. The H-side column AER block 222 outputs a signal obtained by delaying a high-level response AckHXa1 to the OR gate 224. The L-side column AER block 223 performs a handshake when the low-level request ReqLXp1 is input. The L-side column AER block 223 outputs a signal obtained by delaying a high-level response AckLXa1 to the OR gate 224. Further, the H-side column AER block 222 and the L-side column AER block 223 invert the low-level request supplied from the pixel array unit 300. The configurations of the H-side column AER block 222 and the L-side column AER block 223 are similar to that of the row AER block 270 shown in FIG. 12. Note that the configurations of those row or column AER blocks are not limited to the circuit shown in FIG. 12, as long as the row or column AER blocks can perform a handshake.

The OR gate 224 outputs the logical sum of the signals supplied from the H-side column AER block 222 and the L-side column AER block 223 as the response AckXp1.

[Configuration Example of Row Arbiter]

Figure 15:
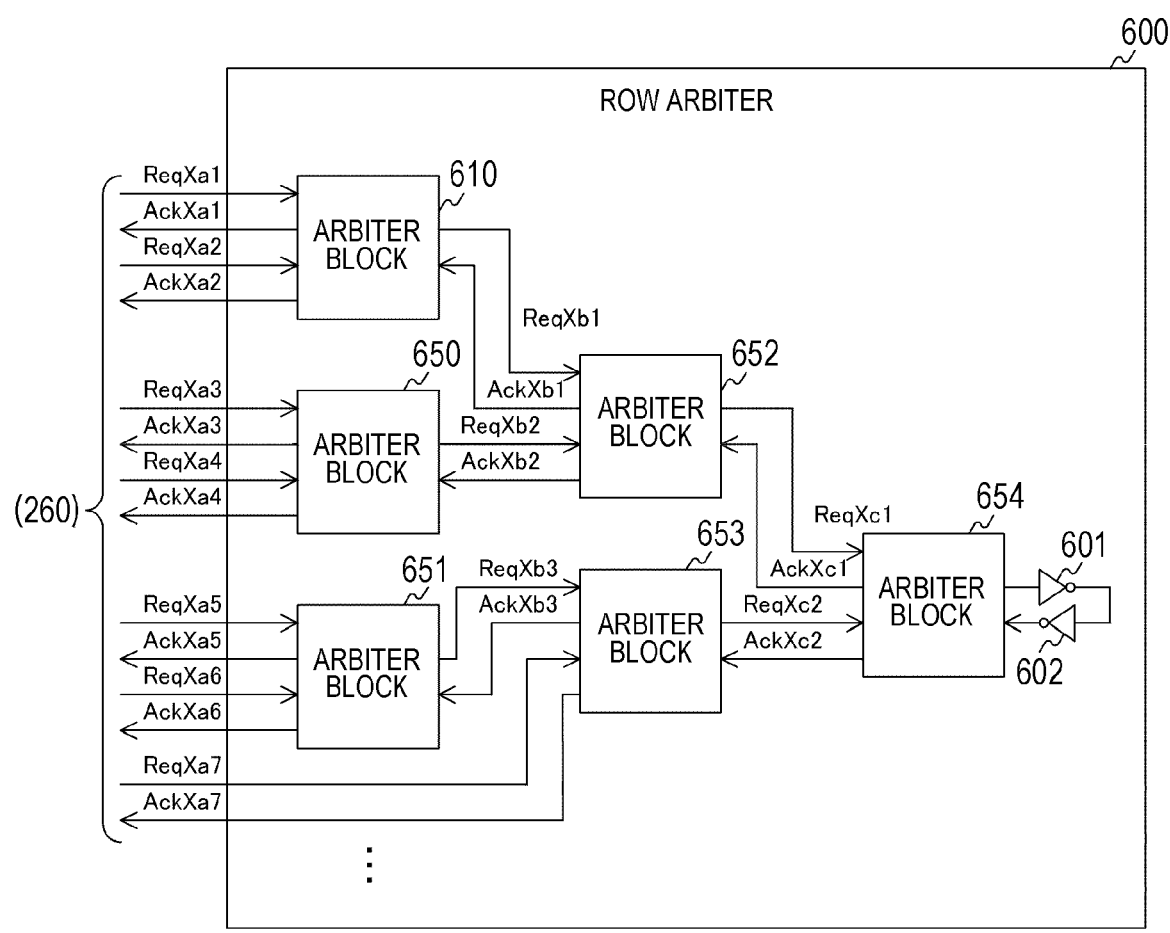
FIG. 15 is a block diagram showing a configuration example of a row arbiter in the first embodiment of the present technology.

FIG. 15 is a block diagram showing a configuration example of the row arbiter 600 in the first embodiment of the present technology. The row arbiter 600 includes arbiter blocks 610 and 650 to 654 and inverters 601 and 602 in every seven rows. Note that FIG. 15 is a diagram obtained in a case where the number of vertical event-driven pixels is seven. For example, in a case where the number of vertical event-driven pixels is one thousand, ten arbiters are provided to cover up to 2^10 (=1024 pixels).

The arbiter block 610 arbitrates between a request from the first row and a request from the second row. The arbiter block 610 performs a handshake with the arbiter block 652, and outputs a response to the first or second row on the basis of an arbitration result.

The arbiter block 650 arbitrates between a request from the third row and a request from the fourth row. The arbiter block 650 performs a handshake with the arbiter block 652, and outputs a response to the third or fourth row on the basis of an arbitration result.

The arbiter block 651 arbitrates between a request from the fifth row and a request from the sixth row. The arbiter block 651 performs handshake with the arbiter block 653, and outputs a response to the fifth or sixth row on the basis of an arbitration result.

The arbiter block 652 arbitrates between the request from the arbiter block 610 and the request from the arbiter block 650. The arbiter block 652 performs a handshake with the arbiter block 654, and outputs a response to the arbiter block 610 or 650 on the basis of an arbitration result.

The arbiter block 653 arbitrates between the request from the arbiter block 651 and a request from the seventh row. The arbiter block 653 performs a handshake with the arbiter block 654, and outputs a response to the arbiter block 651 or seventh row on the basis of an arbitration result.

The arbiter block 654 arbitrates between the request from the arbiter block 652 and the request from the arbiter block 653. The arbiter block 654 delays a response to the earlier request in the inverters 601 and 602 and then supplies the delayed response to the arbiter block 652 or 653.

Note that a configuration of the column arbiter 213 is similar to that of the row arbiter 600. Further, the configurations of those arbiters are not limited to the configuration shown in FIG. 15, as long as the arbiters can arbitrate between requests.

[Configuration Example of Arbiter Block]

Figure 16:
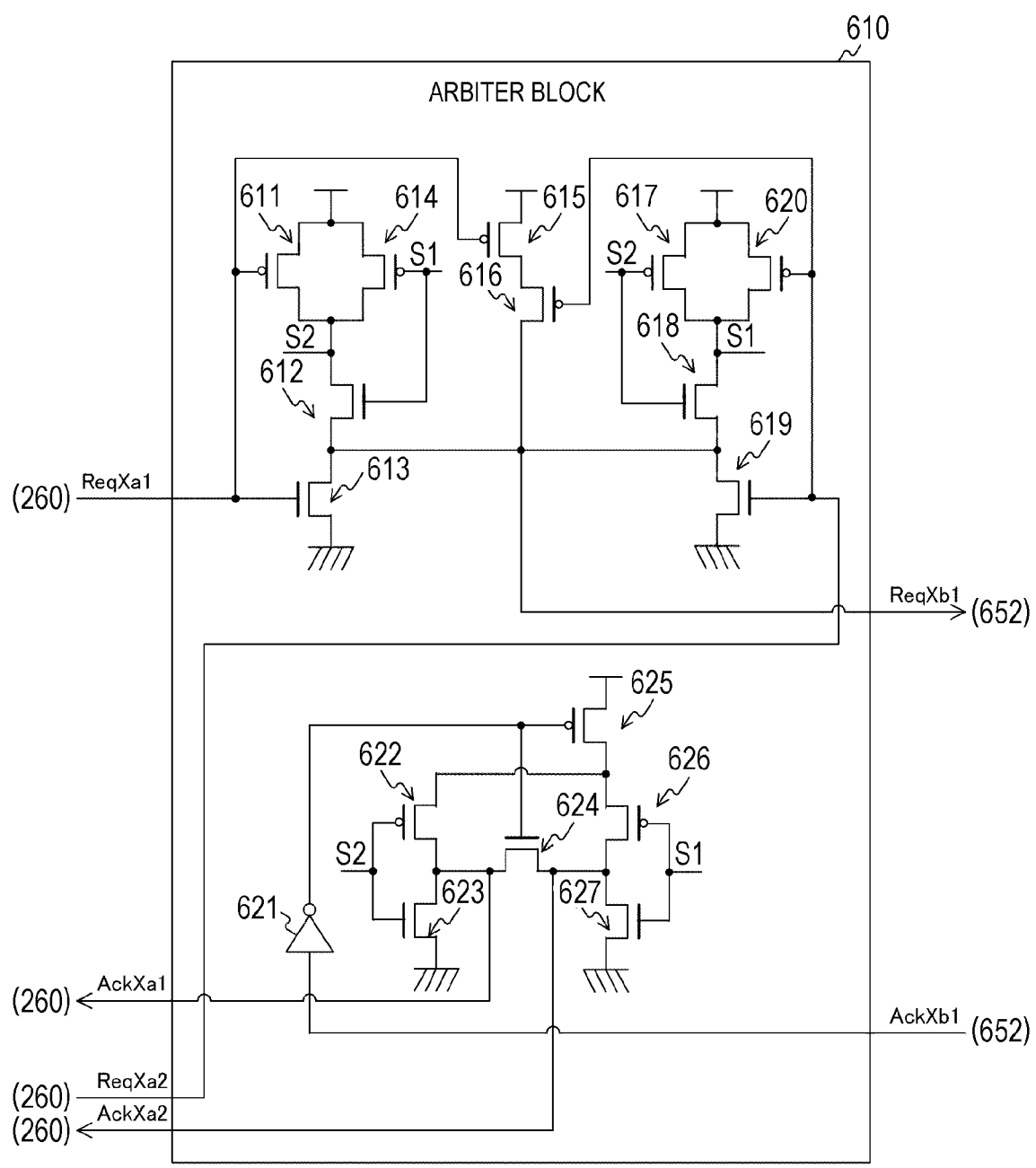
FIG. 16 is a circuit diagram showing a configuration example of an arbiter block in the first embodiment of the present technology.

FIG. 16 is a circuit diagram showing a configuration example of the arbiter block 610 in the first embodiment of the present technology. The arbiter block 610 includes pMOS transistors 611, 614, 615 to 617, 620, 622, 625, and 626, nMOS transistors 612, 613, 618, 619, 623, 624, and 627, and an inverter 621.

The pMOS transistors 611 and 614 are connected in parallel to the power supply. The nMOS transistors 612 and 613 are connected in series between drains of the pMOS transistors 611 and 614 and a ground terminal. Further, a request ReqXa1 from the first row is input to gates of the pMOS transistor 611 and the nMOS transistor 613.

The pMOS transistors 615 and 616 are connected in series to the power supply. Further, the request ReqXa1 is input to a gate of the pMOS transistor 615, and a request ReqXa2 from the second row is input to a gate of the pMOS transistor 616.

The pMOS transistors 617 and 620 are connected in parallel to the power supply. The nMOS transistors 618 and 619 are connected in series between drains of the pMOS transistors 617 and 620 and a ground terminal. Further, gates of the pMOS transistor 617 and the nMOS transistor 618 are connected to the drains of the pMOS transistors 611 and 614. The request ReqXa2 is input to gates of the pMOS transistor 620 and the nMOS transistor 619. The drains of pMOS transistors 617 and 620 are connected to gates of pMOS transistor 614 and nMOS transistor 612.

Further, a connection point between the nMOS transistors 612 and 613, a drain of the pMOS transistor 616, and a connection point between the nMOS transistors 618 and 619 are connected to a signal line that transmits a request ReqXb1. The request ReqXb1 is output to the higher arbiter block 652.

The inverter 621 inverts a response AckXb1 from the higher arbiter block 652. The inverter 621 outputs the inverted signal to gates of the pMOS transistor 625 and the nMOS transistor 624.

The pMOS transistors 625 and 626 and the nMOS transistor 627 are connected in series between the power supply and a ground terminal. Further, the pMOS transistor 622 and the nMOS transistor 623 are connected in series between a connection point between the pMOS transistors 625 and 626 and a ground terminal. A source and drain of the nMOS transistor 624 are connected to a connection point between the pMOS transistor 622 and the nMOS transistor 623 and a connection point between the pMOS transistor 626 and the nMOS transistor 627.

Further, gates of the pMOS transistor 622 and the nMOS transistor 623 are connected to the drains of the pMOS transistors 611 and 614. Gates of the pMOS transistor 626 and nMOS transistor 627 are connected to the drains of pMOS transistors 617 and 620. The connection point between the pMOS transistor 622 and the nMOS transistor 623 is connected to a signal line that transmits a response AckXa1 to the first row. The connection point between the pMOS transistor 626 and the nMOS transistor 627 is connected to a signal line that transmits a response AckXa2 to the second row.

With the above configuration, upon receipt of the request ReqXa1 or the request ReqXa2, the arbiter block 610 outputs the request ReqXb1. Then, upon receipt of the response AckXb1, the arbiter block 610 outputs a response to a request that arrives earlier between the request ReqXa1 and the request ReqXa2.

Note that configurations of the arbiter blocks 650 to 654 are similar to that of the arbiter block 610 shown in FIG. 16.

Figure 17:
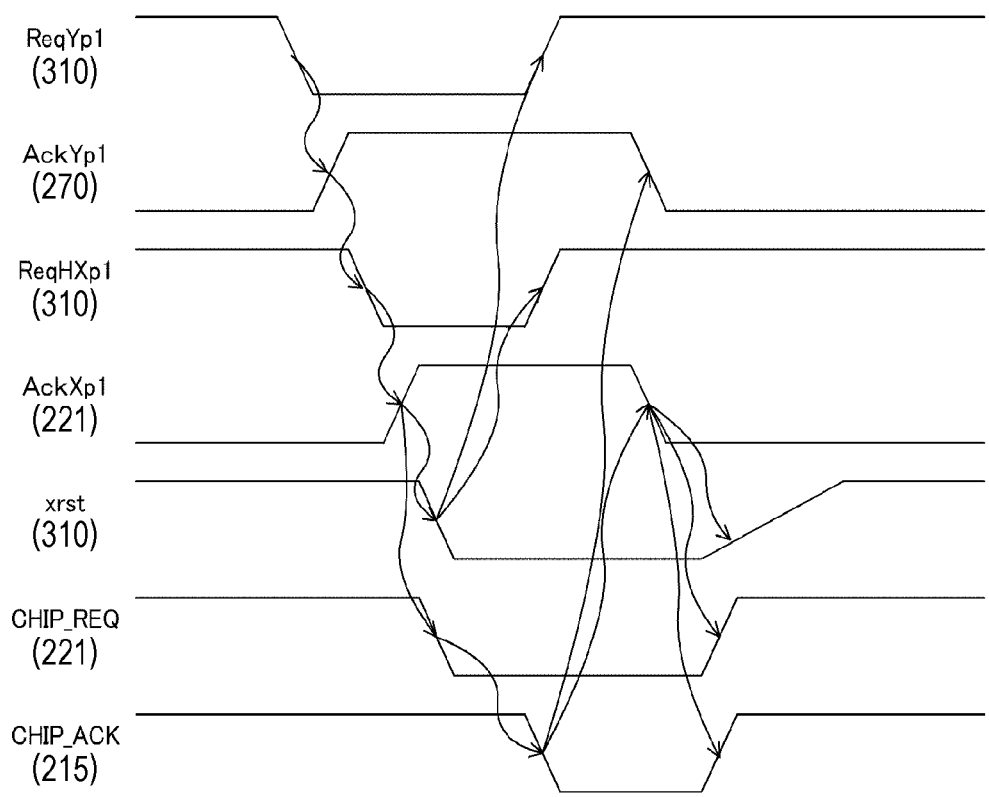
FIG. 17 is a timing chart showing an example of a handshake in the first embodiment of the present technology.

FIG. 17 is a timing chart showing an example of a handshake in the first embodiment of the present technology. When the pixel 310 outputs the low-level request ReqYp1, the row AER block 270 returns the high-level response AckYp1 in a case where the response CHIP_ACK is at a high level.

Upon receipt of the response AckYp1, the pixel 310 outputs the low-level request ReqHXp1 in a case where an on event occurs. Note that, in a case where an off event occurs, the low-level request ReqLXp1 is output.

Upon receipt of the request ReqHXp1, the column AER block 221 returns the high-level response AckXp1 in a case where the response CHIP_ACK is at a high level. Upon receipt of the response AckXp1, the pixel 310 generates the low-level reset signal xrst and initializes the requests ReqYp1 and ReqHXp1 to a high level.

Further, when the column AER block 221 outputs the response AckXp1, the column AER block 221 outputs a low-level request CHIP_REQ. Upon receipt of the request CHIP_REQ, the state machine 215 transfers a detection result of an address event to the DSP circuit 120, and returns the low-level response CHIP_ACK.

Upon receipt of the response CHIP_ACK, the row AER block 270 initializes the response AckYp1 to a low level in a case where the request ReqYp1 is at a high level. Further, upon receipt of the response CHIP_ACK, the column AER block 221 initializes the response AckXp1 to a low level in a case where the request ReqHXp1 is at a high level.

When the response AckXp1 is initialized, the pixel 310 initializes the reset signal xrst to a high level, and the column AER block 221 initializes the request CHIP_REQ to a high level. Further, the state machine 215 initializes the response CHIP_ACK to a high level.

[Operation Example of Solid-State Imaging Element]

Figure 18:
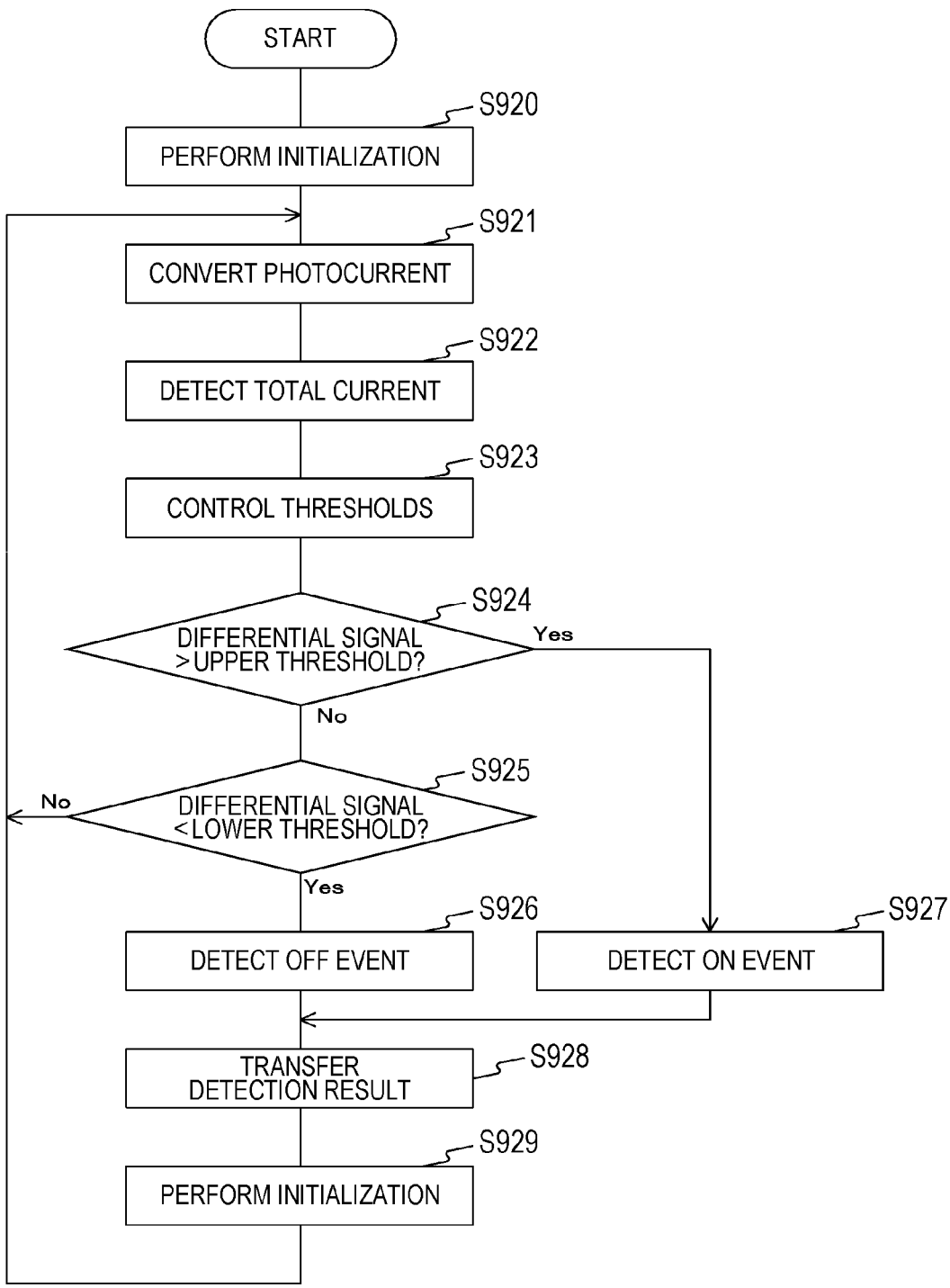
FIG. 18 is a flowchart showing an example of AER processing in the first embodiment of the present technology.

FIG. 18 is a flowchart showing an example of AER processing in the first embodiment of the present technology. The AER processing is started when, for example, a predetermined application for detecting an address event is executed.

The pixel 310 performs initialization by using the reset signal xrst or the like (step S920), and converts a photocurrent into a differential signal (step S921). Further, the current detection unit 410 detects a total current (step S922), and the threshold control unit 420 controls thresholds (an upper threshold and a lower threshold) in accordance with the total current (step S923). Then, the pixel 310 compares an amount of change in a voltage depending on luminance (differential signal) with the upper threshold, and determines whether or not the differential signal exceeds the upper threshold (step S924).

In a case where the differential signal exceeds the upper threshold (step S924: Yes), then the pixel 310 detects an on event (step S927). Meanwhile, in a case where the differential signal is equal to or less than the upper threshold (step S924: No), the pixel 310 determines whether or not the differential signal falls below the lower threshold (step S925).

In a case where the differential signal falls below the lower threshold (step S925: Yes), the pixel 310 detects an off event (step S926). After step S926 or S927, the pixel 310 transfers a detection result by handshaking (step S928) and performs initialization (step S929).

In a case where the differential signal is equal to or larger than the lower threshold (step S925: No) or after step S929, the pixel 310 and the like repeatedly execute step S921 and subsequent steps.

Figure 19:
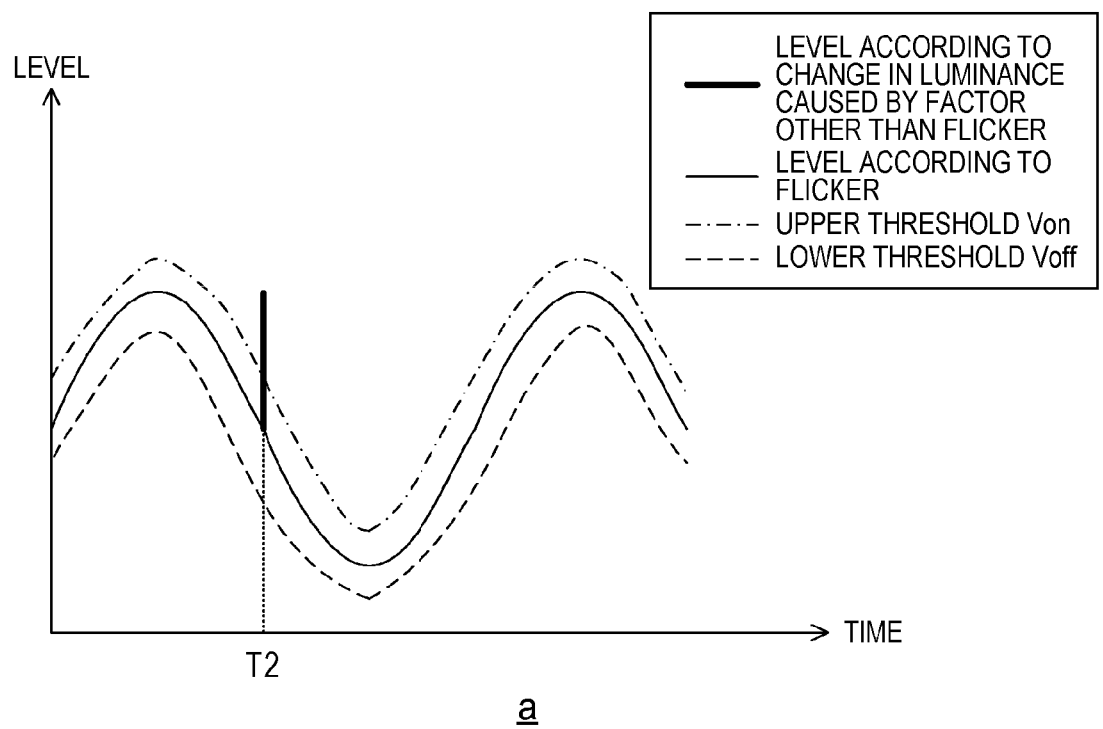
FIG. 19 shows an example of a detection result of an address event in the first embodiment of the present technology.
Figure 19:
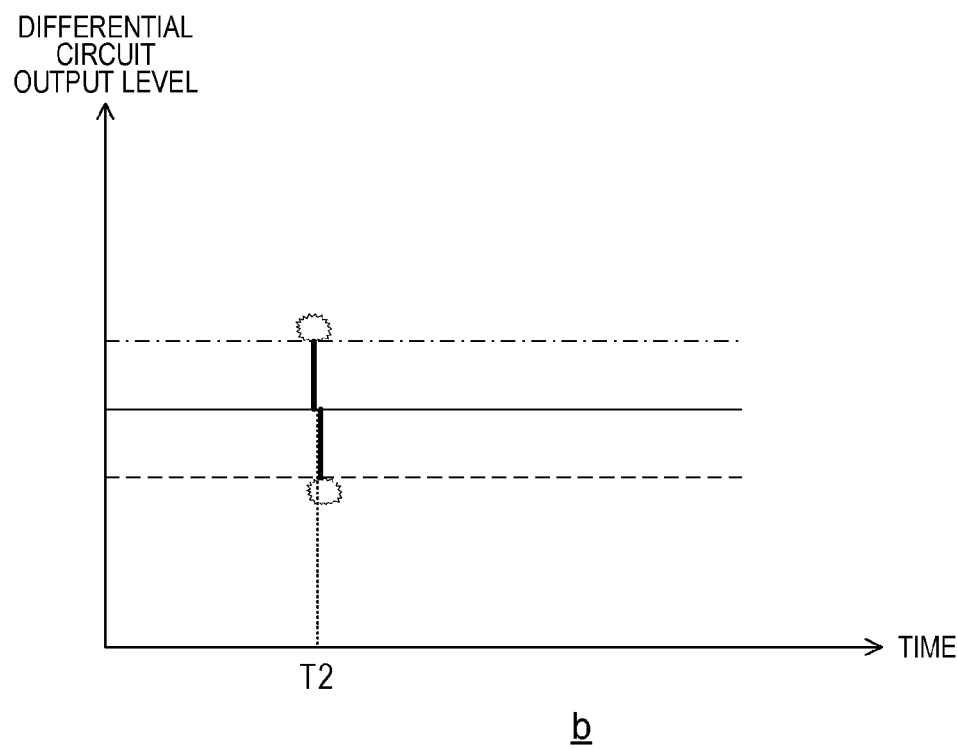
Figure 20:
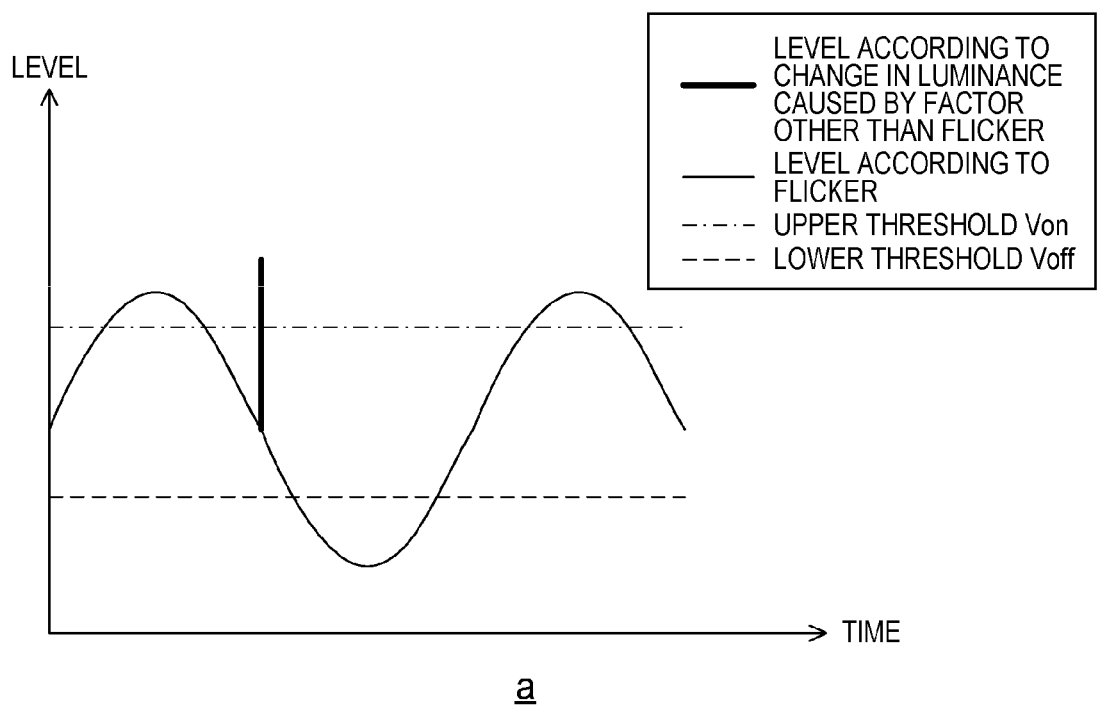
FIG. 20 shows an example of a detection result of an address event in a comparative example.
Figure 20:
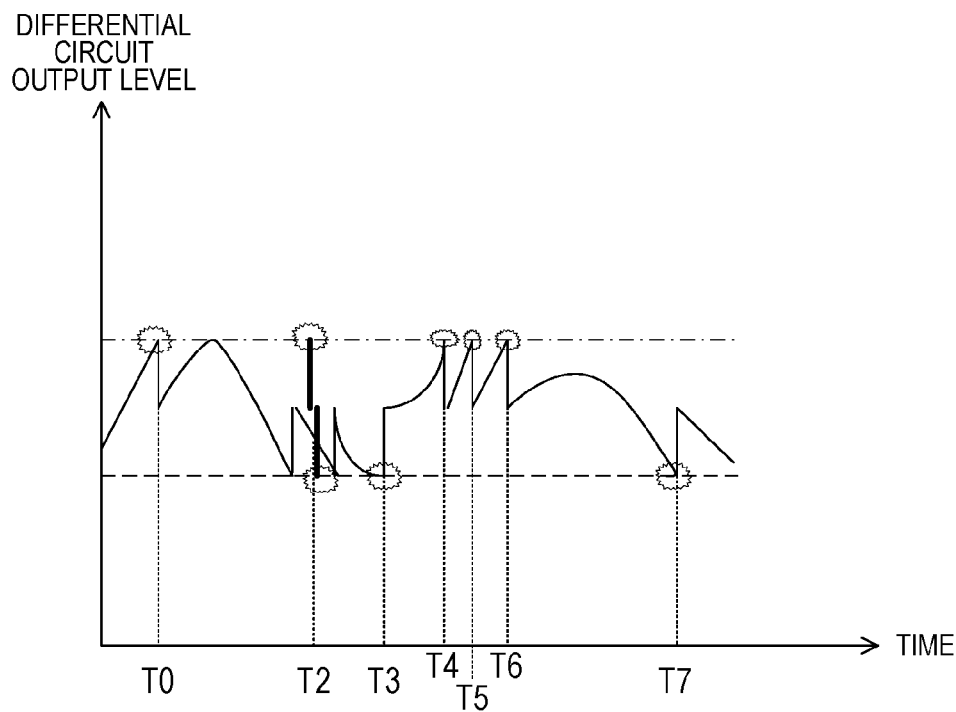

FIG. 19 shows an example of a detection result of an address event in the first embodiment of the present technology. FIG. 20 shows an example of a detection result of an address event in a comparative example. Parts "a" of FIGS. 19 and 20 show examples of a change in a level of a signal from a pixel in the first embodiment and comparative example of the present technology, and parts "b" of FIGS. 19 and 20 show examples of a detection result of an address event in the first embodiment and the comparative example. In the parts "a" of FIGS. 19 and 20, the vertical axis represents the level of the signal, and the horizontal axis represents time. In the parts "b" of FIGS. 19 and 20, the vertical axis represents a level of an output signal from the differential circuit, and the horizontal axis represents time. Further, the thin solid-line curve represents a locus of a level of a differential signal that changes in accordance with flicker. The thick solid line represents a level of a differential signal that changes in accordance with a change in luminance caused by a factor other than flicker. The long dashed short dashed line represents the upper threshold Von, and the dashed line represents the lower threshold Voff.

Under a light source such as a fluorescent lamp where flicker occurs, a differential signal obtained by converting a photocurrent periodically changes due to an influence of the flicker, as indicated by the thin solid line. For example, assuming that a period of the flicker is 60 Hertz (Hz), a period at which the differential signal changes also becomes 60 Hertz (Hz).

Herein, a comparative example in which the upper threshold Von and the lower threshold Voff are fixed to certain values is assumed, as shown in the part "a" of FIG. 20. In this comparative example, as shown in the part "b" of FIG. 20, when a differential signal changes in accordance with flicker, a level thereof may exceed the upper threshold Von or fall below the lower threshold Voff. For example, at timings T0, T4 to T6, and the like, the level of the differential signal exceeds the upper threshold Von. Thus, an on event is detected. Further, at timings T3, T7, and the like, the level of the differential signal falls below the lower threshold Voff. Thus, an off event is detected. Further, when a change in luminance caused by a factor other than flicker occurs at a timing T2, an on event or off event is detected.

Generally, in in-vehicle systems or monitoring systems, flicker is not a target to be detected as an address event. For this reason, an address event that is erroneously detected due to flicker is treated as noise in image data. In a case where the upper threshold Von and the lower threshold Voff are set to fixed values as in the above comparative example, noise may be generated due to flicker.

Meanwhile, the solid-state imaging element 200 according to the first embodiment detects the total current Ipix_tot of all the pixels and controls the upper threshold Von and the lower threshold Voff to higher values as the current is larger.

In this configuration, as shown in the part "a" of FIG. 19, when illuminance of the light source changes due to flicker, photocurrents increase or decrease in all the pixels, and the total current Ipix_tot that is the sum thereof increases and decreases. Thus, the upper threshold Von and the lower threshold Voff also change in accordance with flicker. Therefore, even if the level of the signal changes due to flicker, no on event or off event is detected as shown in "b" of FIG. 19. Meanwhile, when a change in luminance caused by a factor other than flicker occurs at the timing T2, the level of the differential signal exceeds the upper threshold Von. Thus, an on event is detected. Therefore, it is possible to reduce noise caused by flicker and detect only an address event to be detected with high accuracy.

Figure 21:
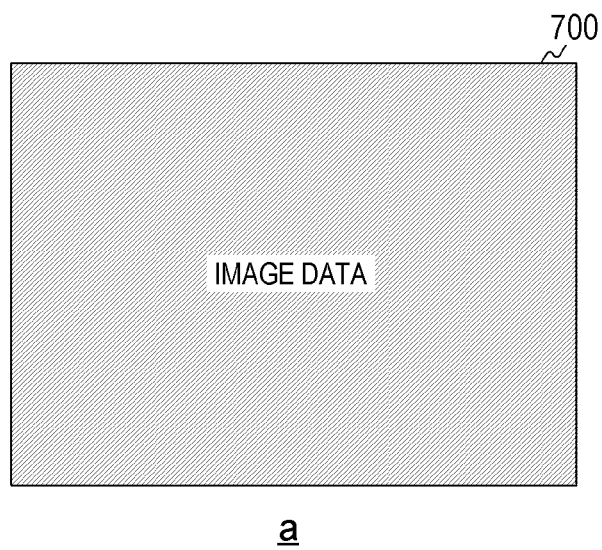
FIG. 21 shows an example of a change in image data in the first embodiment of the present technology.
Figure 21:
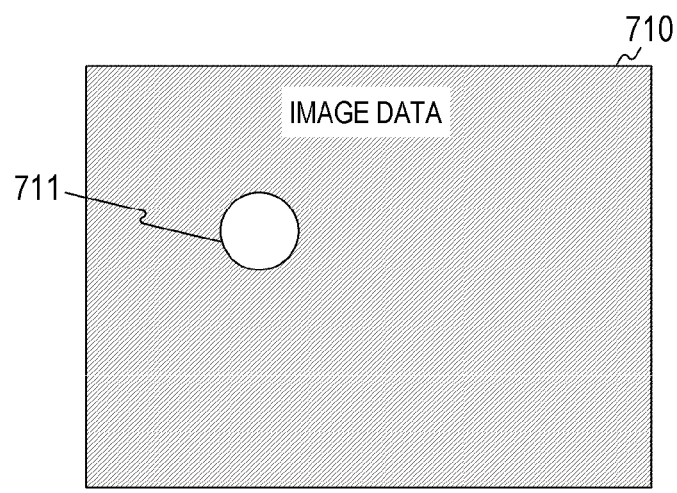

FIG. 21 shows an example of a change in image data in the first embodiment of the present technology. A part "a" of FIG. 21 shows an example of image data 700 obtained before a change in luminance caused by a factor other than flicker occurs, and a part "b" of FIG. 21 shows an example of image data 710 obtained when a change in luminance caused by a factor other than flicker occurs. In FIG. 21, a hatched part represents a region where no address event is detected, and a white part represents a region where an address event is detected.

Even if flicker occurs, the upper threshold Von and the lower threshold Voff are controlled in accordance with the flicker. Thus, no noise occurs due to the flicker in the image data 700. Meanwhile, when a change in luminance caused by a factor other than flicker occurs, an address event is detected, as represented by a region 711 or the like in the image data 710.

Figure 22:
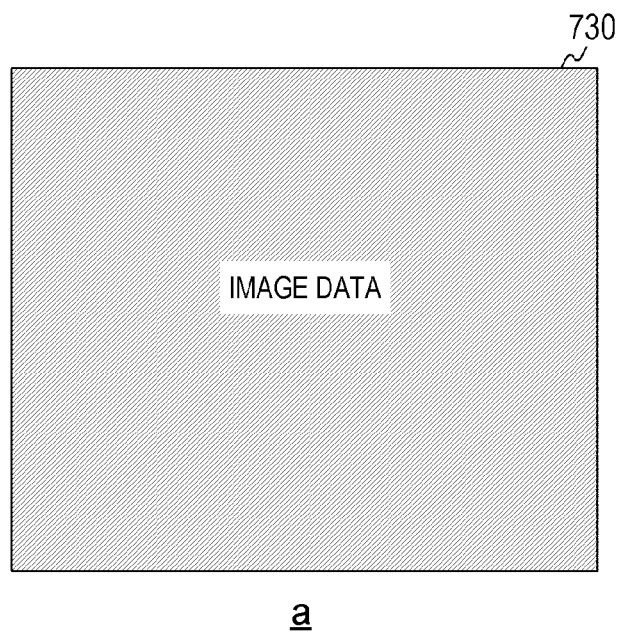
FIG. 22 shows an example of a change in image data in a comparative example.
Figure 22:
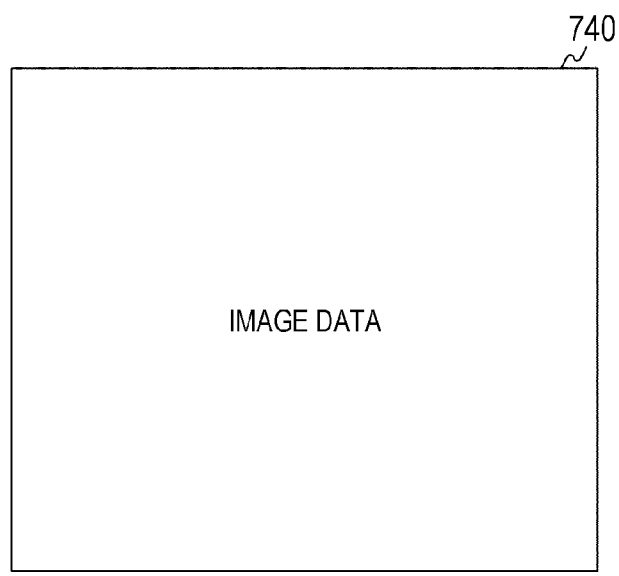

FIG. 22 shows an example of a change in image data in a comparative example in which the upper threshold Von and the lower threshold Voff are set to fixed values. A part "a" of FIG. 22 shows an example of image data 730 obtained before luminance changes due to flicker, and a part "b" of FIG. 22 shows an example of image data 740 obtained when luminance changes due to flicker. In FIG. 21, a hatched part represents a region where no address event is detected, and a white part represents a region where an address event is detected.

No address event is detected in the image data 730 obtained before luminance changes due to flicker. Meanwhile, in the image data 740 obtained when luminance changes due to flicker, an address event is erroneously detected in all pixels. As a result, noise is generated in the image data due to flicker.

As described above, according to the first embodiment of the present technology, the solid-state imaging element 200 controls the thresholds to values corresponding to the total current of all the pixels. This makes it possible to suppress erroneous detection of an address event caused by a change in the total current obtained when flicker occurs. Therefore, it is possible to reduce noise caused by flicker in image data.

2. Second Embodiment

In the above first embodiment, the threshold control unit 420 controls the adjustment current and the combined resistance by using the decoder, adds and subtracts the fixed offset currents Iofs+ and Iofs−, and converts the resultant values into the upper threshold Von and the lower threshold Voff. However, because the offset currents are fixed in this configuration, it may be difficult to make fine adjustment of the upper threshold Von and the lower threshold Voff. The solid-state imaging element 200 of the second embodiment is different from that of the first embodiment in that the offset currents are further controlled.

Figure 23:
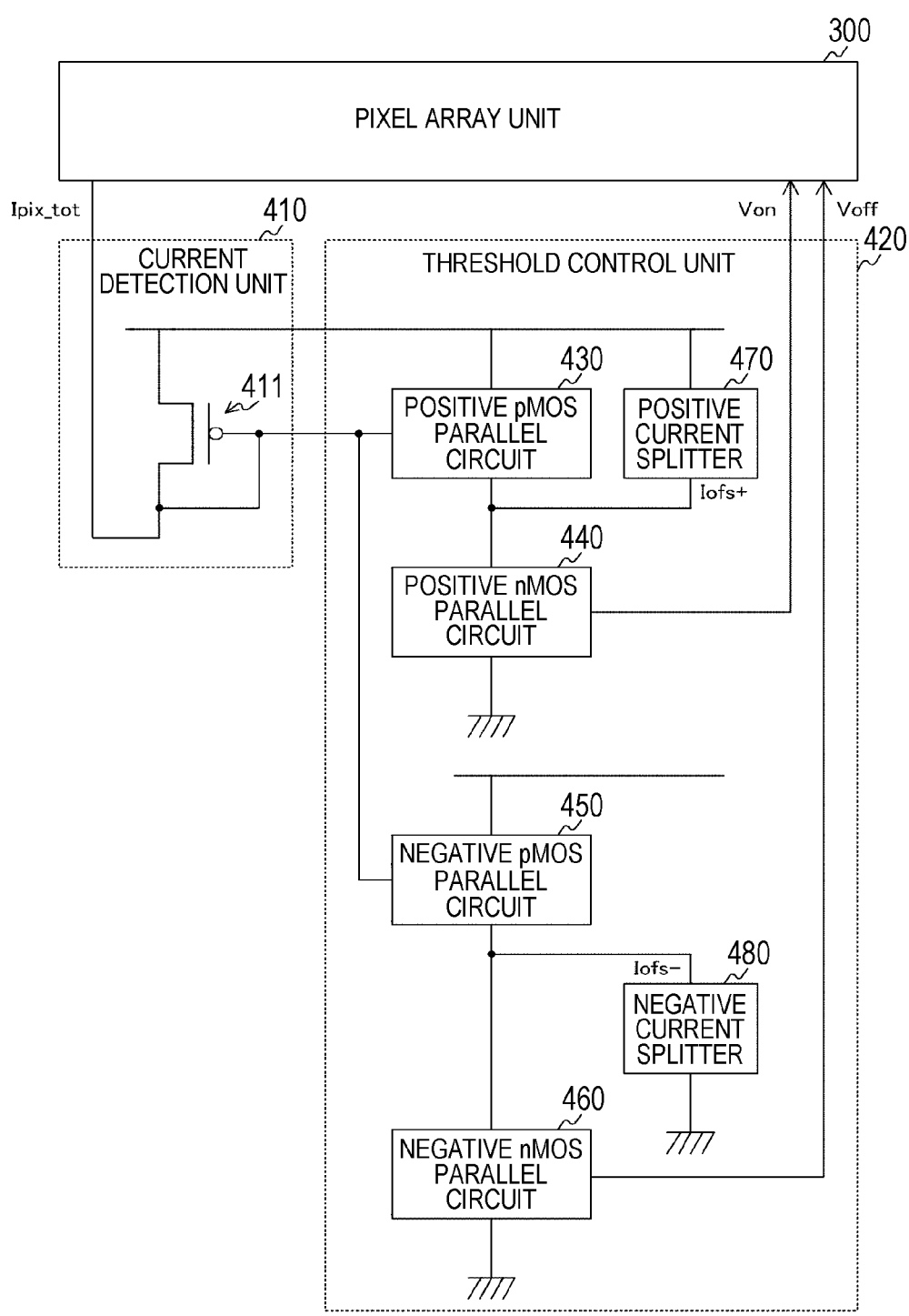
FIG. 23 is a block diagram showing a configuration example of a current detection unit and a threshold control unit in a second embodiment of the present technology.

FIG. 23 is a block diagram showing a configuration example of a current detection unit 410 and a threshold control unit 420 in the second embodiment of the present technology. The threshold control unit 420 of the second embodiment is different from that of the first embodiment in that a positive current splitter 470 and a negative current splitter 480 are provided, instead of the positive offset current source 421 and the negative offset current source 422.

Figure 24:
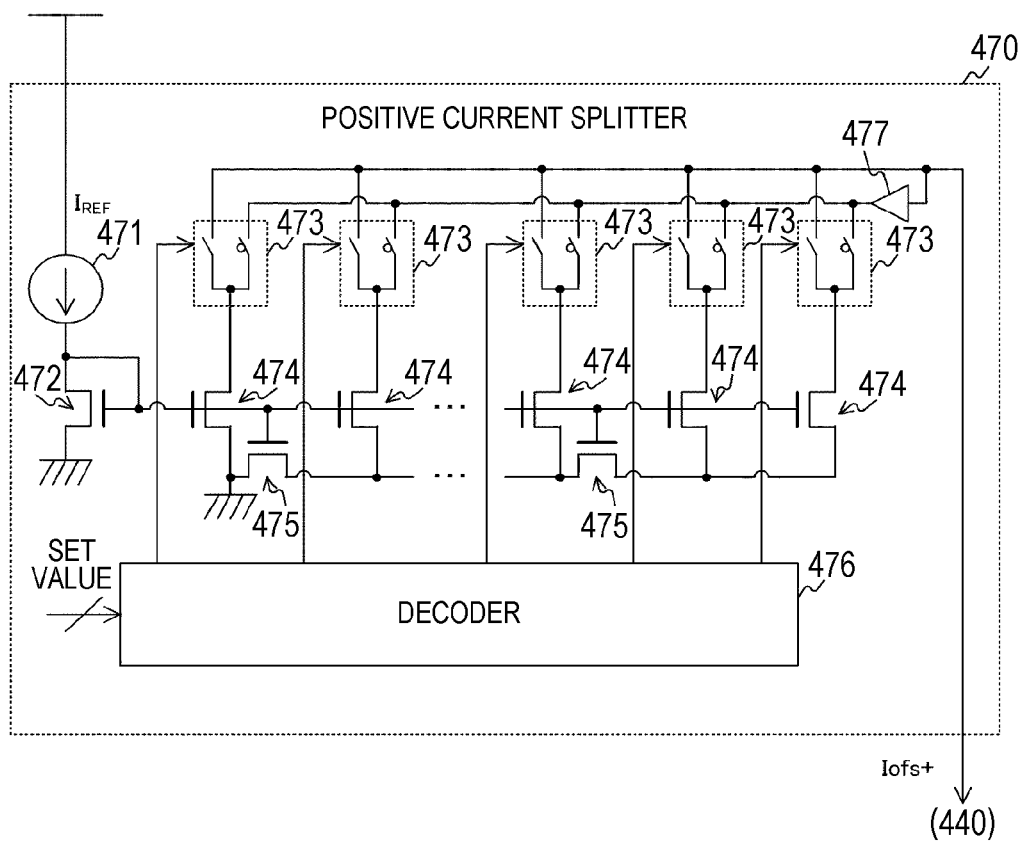
FIG. 24 is a circuit diagram showing a configuration example of a positive current splitter in the second embodiment of the present technology.

FIG. 24 is a circuit diagram showing a configuration example of the positive current splitter 470 in the second embodiment of the present technology. The positive current splitter 470 includes a reference current source 471, an nMOS transistor 472, m+1 switches 473, m+1 nMOS transistors 474, m−1 nMOS transistors 475, a decoder 476, and a buffer 477.

The reference current source 471 generates a predetermined reference current $I_{REF}$ and supplies the reference current to a drain of the nMOS transistor 472.

The drain and a gate of the nMOS transistor 472 are short-circuited, and a source thereof is grounded.

The switches 473 are associated with the different nMOS transistors 474, respectively. Each switch 473 connects a drain of the corresponding transistor to either the buffer 477 or a positive nMOS parallel circuit 440 serving as an output destination under the control of the decoder 476.

A gate of each of the nMOS transistors 474 is connected to the gate of the nMOS transistor 472. Further, sources of the respective nMOS transistors 474 are connected in common to a ground terminal.

A gate of each of the nMOS transistors 475 is connected to the gate of the nMOS transistor 472. Further, a drain and source of the mth nMOS transistor 475 are connected to sources of the mth and (m+1)th nMOS transistors 474, respectively.

The decoder 476 controls each switch 473 in accordance with a predetermined set value held in a register or the like in advance.

An input terminal of the buffer 477 is connected to the positive nMOS parallel circuit 440 serving as the output destination, and an output terminal thereof is connected to each switch 473.

Each nMOS transistor 474 forms a current mirror circuit with the nMOS transistor 472. Those current mirror circuits can generate a plurality of distribution currents by distributing the total current at a distribution ratio according to a gate width and gate length of each transistor. Note that a circuit including the m+1 switches 473, the m+1 nMOS transistors 474, and the m−1 nMOS transistors 475 is an example of a first distribution circuit recited in the claims.

For example, a gate width W and a gate length L of each of the nMOS transistor 472 and the first to mth nMOS transistors 474 are set to values satisfying the following expression.

$$W/L = (N-1) \times \alpha \qquad \text{Expression 6}$$

The gate width W and the gate length L of the (m+1)th nMOS transistor 472 are set to values satisfying the following expression.

$$W/L = \alpha \qquad \text{Expression 7}$$

Further, the gate width W and the gate length L of the nMOS transistor 475 are set to values satisfying the following expression.

$$W/L = N \times \alpha/(N-1) \qquad \text{Expression 8}$$

In a case where the gate width W and gate length L satisfying Expressions 6 to 8 are set, a distribution current $I_m$ flowing through the first to mth nMOS transistors 472 is expressed by the following expression.

$$I_m = IREF/N^{m-1} \qquad \text{Expression 9}$$

Further, a distribution current $I_{m+1}$ flowing through the (m+1)th nMOS transistor 472 is expressed by the following expression.

$$I_{m+1} = IREF/\{N^{m-1}(N-1)\} \qquad \text{Expression 10}$$

When the decoder 476 controls a connection destination of the switch 473 in accordance with the set value, it is possible to control the offset current Iofs+ on the order of sub-picoampere on the basis of Expressions 9 and 10. For example, in a case where connection destinations of the first and (m+1)th switches 473 are set to the output side and other connection destinations are set to the buffer 477, the offset current Iofs+ can be controlled to the sum of the distribution currents $I_1$ and $I_{m+1}$. Note that the decoder 476 is an example of a first decoder in the claims. Further, the configuration of the positive current splitter 470 is not limited to the circuit shown in FIG. 24, as long as the positive current splitter 470 can control the offset current Iofs+.

As described above, according to the second embodiment of the present technology, not only the adjustment current and the combined resistance but also the offset current is controlled. Therefore, fine adjustment of the upper threshold Von and the lower threshold Voff can be easily made, as compared with a case where only the adjustment current and the combined resistance are controlled.

3. Examples of Application to Moving Objects

The technology according to the present disclosure (present technology) is applicable to various products. For example, the technology according to the present disclosure may be realized as an apparatus to be mounted on any type of moving objects such as an automobile, an electric vehicle, a hybrid electric vehicle, a motorcycle, a bicycle, personal mobility, an airplane, a drone, a ship, and a robot.

Figure 25:
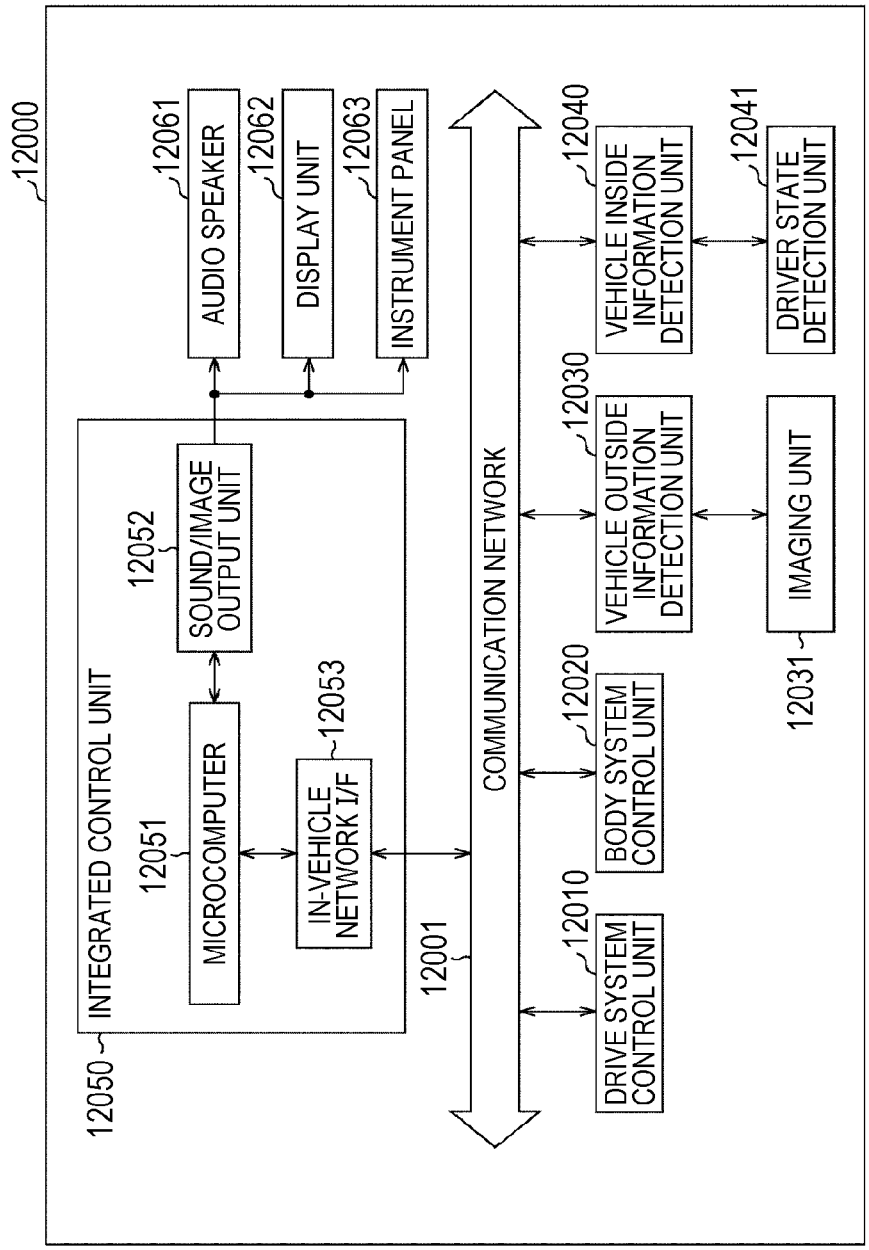
FIG. 25 is a block diagram showing a schematic configuration example of a vehicle control system.

FIG. 25 is a block diagram showing a schematic configuration example of a vehicle control system that is an example of a moving object control system to which the technology according to the present disclosure is applicable.

A vehicle control system 12000 includes a plurality of electronic control units connected via a communication network 12001. In the example shown in FIG. 25, the vehicle control system 12000 includes a drive system control unit 12010, a body system control unit 12020, a vehicle outside information detection unit 12030, a vehicle inside information detection unit 12040, and an integrated control unit 12050. Further, the integrated control unit 12050 includes, as a functional configuration, a microcomputer 12051, a sound/image output unit 12052, and an in-vehicle network interface (I/F) 12053.

The drive system control unit 12010 controls operation of devices related to a drive system of a vehicle in accordance with various programs. For example, the drive system control unit 12010 functions as a control device for a driving force generator for generating driving force of the vehicle, such as an internal combustion engine or a driving motor, a driving force transmission mechanism for transmitting driving force to wheels, a steering mechanism for adjusting a steering angle of the vehicle, a braking device for generating braking force of the vehicle, and the like.

The body system control unit 12020 controls operation of various devices mounted on a vehicle body in accordance with various programs. For example, the body system control unit 12020 functions as a control device for a keyless entry system, a smart key system, a power window device, or various lamps such as a headlamp, a back lamp, a brake lamp, a blinker, and a fog lamp. In this case, radio waves transmitted from a portable device that substitutes for a key or signals of various switches can be input to the body system control unit 12020. The body system control unit 12020 accepts input of those radio waves or signals and controls the door lock device, the power window device, the lamps, and the like of the vehicle.

The vehicle outside information detection unit 12030 detects information regarding outside of the vehicle on which the vehicle control system 12000 is mounted. For example, the vehicle outside information detection unit 12030 is connected to an imaging unit 12031. The vehicle outside information detection unit 12030 causes the imaging unit 12031 to capture an image of the outside of the vehicle and receives the captured image. On the basis of the received image, the vehicle outside information detection unit 12030 may perform processing of detecting an object such as a person, a vehicle, an obstacle, a sign, or a character on a road surface or processing of detecting a distance.

The imaging unit 12031 is an optical sensor that receives light and outputs an electrical signal corresponding to an amount of the received light. The imaging unit 12031 can output the electrical signal as an image, or can also output the electrical signal as distance measurement information. Further, the light received by the imaging unit 12031 may be visible light or invisible light such as infrared rays.

The vehicle inside information detection unit 12040 detects information regarding inside of the vehicle. For example, the vehicle inside information detection unit 12040 is connected to a driver state detection unit 12041 that detects a state of a driver. The driver state detection unit 12041 includes, for example, a camera that captures an image of the driver, and the vehicle inside information detection unit 12040 may calculate a degree of fatigue or concentration of the driver or determine whether or not the driver falls asleep on the basis of detection information input from the driver state detection unit 12041.

The microcomputer 12051 can calculate a control target value of the driving force generator, the steering mechanism, or the braking device on the basis of the information regarding the inside and outside of the vehicle acquired by the vehicle outside information detection unit 12030 or the vehicle inside information detection unit 12040, and output a control command to the drive system control unit 12010. For example, the microcomputer 12051 can perform cooperative control for the purpose of realizing functions of an advanced driver assistance system (ADAS) including collision avoidance or impact attenuation of vehicles, following traveling based on a following distance, vehicle speed maintenance traveling, vehicle collision warning, vehicle lane departure warning, or the like.

Further, the microcomputer 12051 can perform cooperative control, for example, for the purpose of autonomous driving in which the vehicle autonomously travels without depending on the driver's operation or other purposes by controlling the driving force generator, the steering mechanism, the braking device, or the like on the basis of information regarding surroundings of the vehicle acquired by the vehicle outside information detection unit 12030 or the vehicle inside information detection unit 12040.

Further, the microcomputer 12051 can output a control command to the body system control unit 12020 on the basis of the information regarding the outside of the vehicle acquired by the vehicle outside information detection unit 12030. For example, the microcomputer 12051 can perform cooperative control for the purpose of glare protection by, for example, controlling the headlamp in accordance with a position of a preceding vehicle or oncoming vehicle detected by the vehicle outside information detection unit 12030 to switch a high beam to a low beam.

The sound/image output unit 12052 transmits an output signal of at least one of sound or image to an output device capable of visually or aurally notifying a vehicle passenger or the outside of the vehicle of information. The example of FIG. 25 shows an audio speaker 12061, a display unit 12062, and an instrument panel 12063 as examples of the output device. The display unit 12062 may include, for example, at least one of an on-board display or a head-up display.

Figure 26:
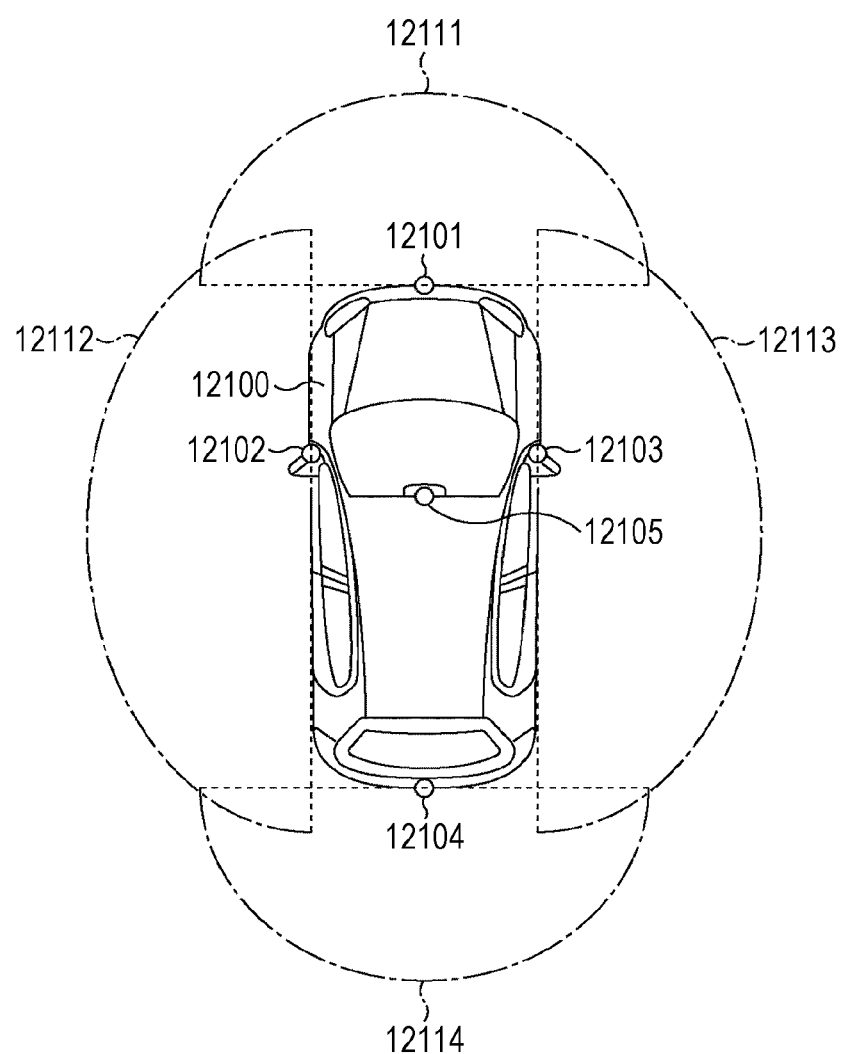
FIG. 26 is an explanatory diagram showing an example of an installation position of an imaging unit.

FIG. 26 shows an example of an installation position of the imaging unit 12031.

In FIG. 26, the imaging unit 12031 includes imaging units 12101, 12102, 12103, 12104, and 12105.

The imaging units 12101, 12102, 12103, 12104, and 12105 are provided at, for example, positions such as a front nose, a side mirror, a rear bumper, a back door, and an upper portion of a windshield in a vehicle interior of the vehicle 12100. The imaging unit 12101 provided at the front nose and the imaging unit 12105 provided at the upper portion of the windshield in the vehicle interior mainly acquire images of a front view of the vehicle 12100. The imaging units 12102 and 12103 provided at the side mirrors mainly acquire images of side views of the vehicle 12100. The imaging unit 12104 provided at the rear bumper or back door mainly acquires an image of a rear view of the vehicle 12100. The imaging unit 12105 provided at the upper portion of the windshield in the vehicle interior is mainly used for detecting a preceding vehicle, a pedestrian, an obstacle, a traffic light, a traffic sign, a lane, or the like.

Note that FIG. 26 shows examples of imaging ranges of the imaging units 12101 to 12104. An imaging range 12111 indicates the imaging range of the imaging unit 12101 provided at the front nose. Imaging ranges 12112 and 12113 indicate the respective imaging ranges of the imaging units 12102 and 12103 provided at the side mirrors. An imaging range 12114 indicates the imaging range of the imaging unit 12104 provided at the rear bumper or back door. For example, an overhead image of the vehicle 12100 viewed from above is obtained by superimposing image data captured by the imaging units 12101 to 12104.

At least one of the imaging units 12101 to 12104 may have a function of acquiring distance information. For example, at least one of the imaging units 12101 to 12104 may be a stereo camera including a plurality of imaging elements, or may be an imaging element including pixels for phase difference detection.

For example, the microcomputer 12051 obtains a distance from each three-dimensional object within the imaging ranges 12111 to 12114 and a temporal change in this distance (relative speed to the vehicle 12100) on the basis of distance information obtained from the imaging units 12101 to 12104 and can therefore particularly extract, as a preceding vehicle, the closest three-dimensional object existing on a traveling path of the vehicle 12100 and travelling at a predetermined speed (e.g., 0 km/h or more) in substantially the same direction as that of the vehicle 12100. Further, the microcomputer 12051 can set a following distance from the preceding vehicle to be secured in advance and perform automatic brake control (including following stop control), automatic acceleration control (including following start control), and the like. Thus, it is possible to perform cooperative control for the purpose of autonomous driving in which the vehicle autonomously travels without depending on the driver's operation or other purposes.

For example, the microcomputer 12051 can classify three-dimensional object data regarding three-dimensional objects into two-wheeled vehicles, standard vehicles, large vehicles, pedestrians, power poles, and other three-dimensional objects on the basis of the distance information obtained from the imaging units 12101 to 12104, extract the three-dimensional object data, and therefore use the three-dimensional object data in order to automatically avoid obstacles. For example, the microcomputer 12051 identifies obstacles around the vehicle 12100 as obstacles that are noticeable for the driver of the vehicle 12100 and obstacles that are hardly noticeable therefor. In addition, the microcomputer 12051 determines a collision risk indicating a risk of collision with each obstacle, and, when the collision risk is equal to or larger than a set value, i.e., in a state in which collision may occur, the microcomputer 12051 can perform driving assistance for collision avoidance by outputting an alarm to the driver via the audio speaker 12061 or the display unit 12062 or by performing forced deceleration or avoidance steering via the drive system control unit 12010.

At least one of the imaging units 12101 to 12104 may be an infrared camera that detects infrared rays. For example, the microcomputer 12051 can recognize a pedestrian by determining whether or not a pedestrian exists in the captured images of the imaging units 12101 to 12104. Such recognition of the pedestrian is carried out by performing, for example, a procedure for extracting feature points in the captured images of the imaging units 12101 to 12104 serving as infrared cameras and a procedure for performing pattern matching processing on a series of the feature points indicating an outline of an object and determining whether or not the object is a pedestrian. When the microcomputer 12051 determines that a pedestrian exists in the captured images of the imaging units 12101 to 12104 and recognizes the pedestrian, the sound/image output unit 12052 controls the display unit 12062 so that a rectangular outline for emphasis is displayed to be superimposed on the recognized pedestrian. Further, the sound/image output unit 12052 may control the display unit 12062 so that an icon or the like indicating the pedestrian is displayed at a desired position.

Hereinabove, an example of the vehicle control system to which the technology according to the present disclosure is applicable has been described. The technology according to the present disclosure is applicable to, for example, the vehicle outside information detection unit 12030 among the configurations described above. Specifically, the imaging apparatus 100 in FIG. 1 is applicable to the vehicle outside information detection unit 12030. By applying the technology according to the present disclosure to the vehicle outside information detection unit 12030, it is possible to reduce noise caused by flicker and obtain a clearer captured image. This makes it possible to improve detection accuracy of a person, a vehicle, and an obstacle.

Note that the above embodiments show examples for embodying the present technology, and the matters in the embodiments and the matters specifying the invention in the claims have a corresponding relationship. Similarly, the matters specifying the invention in the claims and the matters in the embodiments of the present technology represented by the same names as those in the matters specifying the invention in the claims have a corresponding relationship. However, the present technology is not limited to the embodiments, and can be embodied by applying various modifications to the embodiments within the gist thereof.

Further, the processing procedures described in the above embodiments may be regarded as a method having a series of the above procedures, or may be regarded as a program for causing a computer to execute the series of procedures or a recording medium storing the program. The recording medium can be, for example, a compact disc (CD), a MiniDisc (MD), a digital versatile disc (DVD), a memory card, a Blu-ray (registered trademark) disc, or the like.

Note that the effects described in this specification are merely examples, are not limited, and may have other effects.

Note that the present technology may also have the following configurations.

(1) A solid-state imaging element including:
a plurality of pixels, each of which is configured to compare an amount of change in a voltage corresponding to a photocurrent with a predetermined threshold;
a current detection unit configured to detect a sum of the photocurrents of the respective plurality of pixels as a total current; and
a threshold control unit configured to control the predetermined threshold to a value corresponding to the total current.

(2) The solid-state imaging element according to (1), in which
the threshold control unit includes
an adjustment unit configured to adjust the total current and output the total current as an adjustment current,
an offset current source configured to generate a predetermined offset current, and
a conversion unit configured to convert a sum or difference between the adjustment current and the predetermined offset current into the predetermined threshold and supply the threshold to each of the plurality of pixels.

(3) The solid-state imaging element according to (2), in which
the offset current source includes
a reference current source configured to generate a predetermined reference current,
a first distribution circuit configured to distribute the predetermined reference current at a plurality of different ratios to generate a plurality of distribution currents, and
a first decoder configured to control the first distribution circuit and output a sum of a predetermined number of the plurality of distribution currents as the predetermined offset current.

(4) The solid-state imaging element according to (2) or (3), in which
the adjustment unit includes
a second distribution circuit configured to distribute the total current at a plurality of different ratios to generate a plurality of distribution currents, and
a second decoder configured to control the second distribution circuit and output a sum of a predetermined number of the plurality of distribution currents as the adjustment current.

(5) The solid-state imaging element according to any one of (2) to (4), in which
the conversion unit includes
a plurality of resistance elements, and
a third decoder configured to connect a predetermined number of the plurality of resistance elements in parallel and output a voltage generated by the adjustment current flowing through a combined resistance of the predetermined number of resistance elements as the predetermined threshold.

(6) The solid-state imaging element according to any one of (1) to (5), in which
the current detection unit detects a sum of the photocurrents of some of the plurality of pixels as the total current.

(7) The solid-state imaging element according to any one of (1) to (6), in which
the threshold control unit controls the predetermined threshold to a higher value as the total current is larger.

(8) The solid-state imaging element according to any one of (1) to (7), in which:
the predetermined threshold includes an upper threshold and a lower threshold that are different from each other; and
each of the plurality of pixels
detects that the amount of change exceeds the upper threshold as an on event, and
detects that the amount of change falls below the lower threshold as an off event.

(9) An imaging apparatus including:
a plurality of pixels, each of which is configured to compare an amount of change in a voltage corresponding to a photocurrent with a predetermined threshold;
a current detection unit configured to detect a sum of the photocurrents of the respective plurality of pixels as a total current;
a threshold control unit configured to control the predetermined threshold to a value corresponding to the total current; and
a signal processing unit configured to process a signal including a comparison result of each of the plurality of pixels.

(10) A method of controlling a solid-state imaging element, the method including:
a comparison step in which each of a plurality of pixels compares an amount of change in a voltage corresponding to a photocurrent with a predetermined threshold;
a current detection step of detecting a sum of the photocurrents of the respective plurality of pixels as a total current; and
a threshold control step of controlling the predetermined threshold to a value corresponding to the total current.

REFERENCE SIGNS LIST

100 Imaging apparatus
110 Optical unit
120 DSP circuit
130 Display unit
140 Operation unit
150 Bus
160 Frame memory
170 Storage unit
180 Power supply unit
200 Solid-state imaging element
201 Light receiving chip
202 Circuit chip
213 Column arbiter
214 Column address encoder
215 State machine
216 Row address encoder
220 Column AER circuit
221 Column AER block
222 H-side column AER block
223 L-side column AER block
224 OR gate
260 Row AER circuit 270 Row AER block
271, 324, 331, 332, 342, 344, 351, 353, 364, 369, 411, 432, 433, 611, 614 to 617, 620, 622, 625, 626 pMOS transistor
272, 273, 321, 323, 345, 352, 354, 361 to 363, 365 to 368, 370, 371, 442, 472, 474, 475, 612, 613, 618, 619, 623, 624, 627 nMOS transistor
274, 275, 601, 602, 621 Inverter
276 NOR gate
300 Pixel array unit
310 Pixel
320 Logarithmic response unit
322 Photodiode
330, 477 Buffer
340 Differential circuit
341, 343, 372 Capacitor
350 Comparator
360 AER logic circuit
410 Current detection unit
420 Threshold control unit
421 Positive offset current source
422 Negative offset current source
430 Positive pMOS parallel circuit
431, 441, 473 Switch
434, 443, 476 Decoder
440 Positive nMOS parallel circuit
450 Negative pMOS parallel circuit
460 Negative nMOS parallel circuit
470 Positive current splitter
471 Reference current source
480 Negative current splitter
600 Row arbiter
610, 650 to 654 Arbiter block
12030 Vehicle outside information detection unit

The invention claimed is:

1. A solid-state imaging element comprising:
a plurality of pixels, each of which is configured to compare an amount of change in a voltage corresponding to a photocurrent with a predetermined threshold;
current detection circuitry configured to detect a sum of photocurrents of the respective plurality of pixels as a total current; and
threshold control circuitry configured to control the predetermined threshold to a value corresponding to the total current.

2. The solid-state imaging element according to claim 1, wherein
the threshold control circuitry includes
adjustment circuitry configured to adjust the total current and output the total current as an adjustment current,
an offset current source configured to generate a predetermined offset current, and
conversion circuitry configured to convert a sum or difference between the adjustment current and the predetermined offset current into the predetermined threshold and supply the predetermined threshold to each of the plurality of pixels.

3. The solid-state imaging element according to claim 2, wherein
the offset current source includes
a reference current source configured to generate a predetermined reference current,
a first distribution circuit configured to distribute the predetermined reference current at a plurality of different ratios to generate a plurality of distribution currents, and
a first decoder configured to control the first distribution circuit and output a sum of a predetermined number of the plurality of distribution currents as the predetermined offset current.

4. The solid-state imaging element according to claim 2, wherein
the adjustment circuitry includes
a second distribution circuit configured to distribute the total current at a plurality of different ratios to generate a plurality of distribution currents, and
a second decoder configured to control the second distribution circuit and output a sum of a predetermined number of the plurality of distribution currents as the adjustment current.

5. The solid-state imaging element according to claim 2, wherein
the conversion circuitry includes
resistance elements, and
a third decoder configured to connect a predetermined number of the resistance elements in parallel and output a voltage generated by the adjustment current flowing through a combined resistance of the predetermined number of the resistance elements as the predetermined threshold.

6. The solid-state imaging element according to claim 1, wherein
the current detection circuitry detects a sum of the photocurrents of some of the plurality of pixels as the total current.

7. The solid-state imaging element according to claim 1, wherein
the threshold control circuitry controls the predetermined threshold to a higher value as the total current is larger.

8. The solid-state imaging element according to claim 1, wherein:
the predetermined threshold includes an upper threshold and a lower threshold that are different from each other; and
each of the plurality of pixels
detects that the amount of change exceeds the upper threshold as an on event, and
detects that the amount of change falls below the lower threshold as an off event.

9. An imaging apparatus comprising:
a plurality of pixels, each of which is configured to compare an amount of change in a voltage corresponding to a photocurrent with a predetermined threshold;
current detection circuitry configured to detect a sum of photocurrents of the respective plurality of pixels as a total current;
threshold control circuitry configured to control the predetermined threshold to a value corresponding to the total current; and
a signal processor configured to process a signal including a comparison result of each of the plurality of pixels.

10. A method of controlling a solid-state imaging element, the method comprising:
comparing, for each of a plurality of pixels, an amount of change in a voltage corresponding to a photocurrent with a predetermined threshold;
detecting a sum of photocurrents of the respective plurality of pixels as a total current; and
controlling the predetermined threshold to a value corresponding to the total current.

11. The imaging apparatus according to claim 9, wherein the threshold control circuitry includes adjustment circuitry configured to adjust the total current and output the total current as an adjustment current, an offset current source configured to generate a predetermined offset current, and conversion circuitry configured to convert a sum or difference between the adjustment current and the predetermined offset current into the predetermined threshold and supply the predetermined threshold to each of the plurality of pixels.

12. The imaging apparatus according to claim 11, wherein the offset current source includes a reference current source configured to generate a predetermined reference current, a first distribution circuit configured to distribute the predetermined reference current at a plurality of different ratios to generate a plurality of distribution currents, and a first decoder configured to control the first distribution circuit and output a sum of a predetermined number of the plurality of distribution currents as the predetermined offset current.

13. The imaging apparatus according to claim 11, wherein the adjustment circuitry includes a second distribution circuit configured to distribute the total current at a plurality of different ratios to generate a plurality of distribution currents, and a second decoder configured to control the second distribution circuit and output a sum of a predetermined number of the plurality of distribution currents as the adjustment current.

14. The imaging apparatus according to claim 11, wherein the conversion circuitry includes resistance elements, and a third decoder configured to connect a predetermined number of the resistance elements in parallel and output a voltage generated by the adjustment current flowing through a combined resistance of the predetermined number of the resistance elements as the predetermined threshold.

15. The imaging apparatus according to claim 9, wherein the current detection circuitry detects a sum of the photocurrents of some of the plurality of pixels as the total current.

16. The imaging apparatus according to claim 9, wherein the threshold control circuitry controls the predetermined threshold to a higher value as the total current is larger.

17. The imaging apparatus according to claim 9, wherein:

the predetermined threshold includes an upper threshold and a lower threshold that are different from each other; and each of the plurality of pixels detects that the amount of change exceeds the upper threshold as an on event, and detects that the amount of change falls below the lower threshold as an off event.

* * * * *